United States Patent
Zhu et al.

(10) Patent No.: US 12,153,224 B2
(45) Date of Patent: Nov. 26, 2024

(54) DISPLAY METHOD, ELECTRONIC DEVICE, AND SYSTEM

(71) Applicant: HUAWEI TECHNOLOGIES CO., LTD., Guangdong (CN)

(72) Inventors: Shuaishuai Zhu, Dongguan (CN); Yiliang Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 209 days.

(21) Appl. No.: 17/780,409

(22) PCT Filed: Nov. 9, 2020

(86) PCT No.: PCT/CN2020/127413
§ 371 (c)(1),
(2) Date: May 26, 2022

(87) PCT Pub. No.: WO2021/103990
PCT Pub. Date: Jun. 3, 2021

(65) Prior Publication Data
US 2022/0404631 A1    Dec. 22, 2022

(30) Foreign Application Priority Data
Nov. 30, 2019   (CN) .......................... 201911208308.4

(51) Int. Cl.
*G02B 27/01* (2006.01)
*G02B 27/00* (2006.01)
(Continued)

(52) U.S. Cl.
CPC ..... *G02B 27/0179* (2013.01); *G02B 27/0093* (2013.01); *G02B 27/0172* (2013.01);
(Continued)

(58) Field of Classification Search
CPC ............ G02B 27/0179; G02B 27/0093; G02B 27/0172; G02B 2027/0134; G02B 2027/014; H04N 13/117; H04N 13/344
See application file for complete search history.

(56) References Cited

U.S. PATENT DOCUMENTS

| | | | | |
|---|---|---|---|---|
| 5,767,820 A | * | 6/1998 | Bassett | .................... G06F 3/011 |
| | | | | 348/E5.145 |
| 2002/0113755 A1 | * | 8/2002 | Lee | .......................... G02B 7/12 |
| | | | | 345/7 |

(Continued)

FOREIGN PATENT DOCUMENTS

| CN | 102046067 A | 5/2011 |
|---|---|---|
| CN | 102961119 A | 3/2013 |

(Continued)

OTHER PUBLICATIONS

Stafford, J R Translation of CN 105190427 Feb. 25, 2014 (Year: 2014).*

*Primary Examiner* — Zaihan Jiang
(74) *Attorney, Agent, or Firm* — WOMBLE BOND DICKINSON (US) LLP

(57) ABSTRACT

A display method, an electronic device, and a system for correcting display of images on a head-mounted display device are described. In a method, an electronic device may obtain an inter-pupillary distance (IPD) of a user based on user operations entered by the user based on user interfaces displayed on a head-mounted display device, correct a source image based on the IPD of the user to obtain target images used to be displayed on the head-mounted display device, and send the target images to the head-mounted display device. In this way, the user can comfortably and truly experience a 3D scenario when wearing the head-mounted display device.

20 Claims, 13 Drawing Sheets

(51) Int. Cl.
*H04N 13/117* (2018.01)
*H04N 13/344* (2018.01)

(52) U.S. Cl.
CPC .............. *G02B 2027/0134* (2013.01); *G02B 2027/014* (2013.01); *H04N 13/117* (2018.05); *H04N 13/344* (2018.05)

(56) References Cited

U.S. PATENT DOCUMENTS

| | | | | |
|---|---|---|---|---|
| 2002/0122015 | A1* | 9/2002 | Song | G02B 27/0172 345/8 |
| 2004/0150888 | A1* | 8/2004 | Domjan | G02B 27/0172 359/630 |
| 2007/0273983 | A1* | 11/2007 | Hebert | G02B 27/0172 359/708 |
| 2010/0149073 | A1* | 6/2010 | Chaum | G02B 27/0075 345/8 |
| 2012/0212499 | A1* | 8/2012 | Haddick | G02B 27/0093 345/589 |
| 2012/0212598 | A1* | 8/2012 | Mowrey | A61B 3/158 348/78 |
| 2012/0293407 | A1 | 11/2012 | Lee | |
| 2013/0127980 | A1* | 5/2013 | Haddick | G06F 3/013 348/14.08 |
| 2013/0271575 | A1* | 10/2013 | Ullmann | H04N 13/279 348/46 |
| 2014/0118239 | A1* | 5/2014 | Phillips | G06F 3/1454 345/156 |
| 2015/0237336 | A1 | 8/2015 | Sylvan et al. | |
| 2015/0347080 | A1* | 12/2015 | Shin | G06F 3/012 345/173 |
| 2016/0353094 | A1 | 12/2016 | Rougeaux | |
| 2017/0184847 | A1* | 6/2017 | Petrov | H04N 23/56 |
| 2017/0221270 | A1 | 8/2017 | Goslin et al. | |
| 2019/0235255 | A1 | 8/2019 | Seibert et al. | |

FOREIGN PATENT DOCUMENTS

| | | |
|---|---|---|
| CN | 105190427 | * 2/2014 |
| CN | 104076513 A | 10/2014 |
| CN | 105190427 A | 12/2015 |
| CN | 105469004 A | 4/2016 |
| CN | 107506036 A | 12/2017 |
| CN | 107682690 A | 2/2018 |
| CN | 207706338 U | 8/2018 |
| CN | 109690384 A | 4/2019 |
| CN | 109856802 A | 6/2019 |
| CN | 110162186 A | 8/2019 |
| CN | 111103975 A | 5/2020 |
| EP | 3549525 A1 | 10/2019 |
| JP | 2004333661 A | 11/2004 |
| JP | 2011205195 A | 10/2011 |
| WO | 2014108799 A2 | 7/2014 |

* cited by examiner 3D scenario constructed by an electronic device 100

× Center of the first image/second image

○ Center of the first target image/second target image

First image determined based on a second IPD

Second image determined based on the second IPD

First target image

Second target image

Image fused by a user whose inter-pupillary distance is a first IPD

Image fused by a user whose inter-pupillary distance is a second IPD

System 20

Head-mounted display device 400

DISPLAY METHOD, ELECTRONIC DEVICE, AND SYSTEM

This application is a National Stage of International Application No. PCT/CN2020/127413, filed on Nov. 9, 2020, which claims priority to Chinese Patent Application No. 201911208308.4, filed on Nov. 30, 2019 and entitled "DISPLAY METHOD, ELECTRONIC DEVICE, AND SYSTEM". Both of the aforementioned applications are hereby incorporated by reference in their entireties.

TECHNICAL FIELD

This application relates to the field of virtual reality (VR) and terminal technologies, and in particular, to a display method, an electronic device, and a system.

BACKGROUND

With development of computer graphics technologies, a VR technology is gradually applied to people's life. In the VR technology, a three-dimensional (3D) virtual reality scenario is simulated by using a computer, and visual, auditory, tactile, or other sensory simulation experience is provided, so that a user has immersive experience.

A distance between pupil centers of two eyes of a user, that is, an inter-pupillary distance (IPD), is a key that affects whether the user can comfortably and truly experience a 3D scenario provided by a head-mounted display device. Because different users may have different IPDs, and an IPD of a same user may also change at different ages, how to ensure that a user can comfortably and truly experience a 3D scenario when using a head-mounted display device is a research direction in the industry.

SUMMARY

Embodiments of this application provide a display method, an electronic device, and a system. According to the method, an IPD of a user can be measured, and images displayed on a head-mounted display device can be corrected based on the IPD of the user, so that the user can comfortably and truly experience a 3D scenario when wearing the head-mounted display device.

According to a first aspect, an embodiment of this application provides a system. The system includes an electronic device and a head-mounted display device, the electronic device is connected to the head-mounted display device, and the head-mounted display device is configured to be worn on the head of a user. The electronic device is configured to send user interfaces to the head-mounted display device. The head-mounted display device is configured to display the user interfaces on displays. The electronic device is further configured to obtain an IPD of the user, where the IPD of the user is obtained based on user operations entered by the user based on the user interfaces. The electronic device is further configured to: obtain a source image, correct the source image based on the IPD of the user to obtain target images, and send the target images to the head-mounted display device. The head-mounted display device is further configured to display the target images on the displays.

According to the system in the first aspect, the electronic device can measure the IPD of the user, and correct, based on the IPD of the user, the images displayed on the head-mounted display device, so that the user can comfortably and truly experience a 3D scenario when wearing the head-mounted display device.

With reference to the first aspect, in some embodiments, the displays include a first display and a second display, the head-mounted display device further includes a first optical component corresponding to the first display and a second optical component corresponding to the second display, a first straight line on which a center of the first display and a center of the first optical component are located is perpendicular to a third straight line, a second straight line on which a center of the second display and a center of the second optical component are located is perpendicular to the third straight line, and the third straight line is a straight line on which the center of the first optical component and the center of the second optical component are located. The user interfaces include a first user interface and a second user interface, and the head-mounted display device is in embodiments configured to: display the first user interface on the first display, and display the second user interface on the second display. The target images include a first target image and a second target image, and the head-mounted display device is in embodiments configured to: display the first target image on the first display, and display the second target image on the second display.

In the foregoing embodiment, the first display and the first optical component correspond to the left eye of the user, and light emitted by the first display is propagated to the left eye of the user through the first optical component. The second display and the second optical component correspond to the right eye of the user, and light emitted by the second display is propagated to the right eye of the user through the second optical component.

With reference to some embodiments of the first aspect, in some embodiments, the head-mounted display device is further configured to: obtain a first location and a second location, where the first location and the second location are obtained based on an action performed by the user when the first user interface is displayed; obtain a third location and a fourth location, where the third location and the fourth location are obtained based on an action performed by the user when the second user interface is displayed; and send the first location, the second location, the third location, and the fourth location to the electronic device. The electronic device is further configured to: determine an offset $\Delta i1$ of an eye of the user relative to the first straight line based on the first location and the second location, determine an offset $\Delta i2$ of an eye of the user relative to the second straight line based on the third location and the fourth location, and obtain the IPD of the user based on $\Delta i1$ and $\Delta i2$. In this way, the user may indicate the foregoing locations by using the head-mounted display device, so that the electronic device measures the IPD of the user.

Herein, the action performed by the user when the head-mounted display device displays the first user interface may be a rotation action of the eye (for example, the left eye) of the user. The action performed by the user when the head-mounted display device displays the second user interface may be a rotation action of the eye (for example, the right eye) of the user.

With reference to some embodiments of the first aspect, in some embodiments, the head-mounted display device is further configured to send, to the electronic device, operation data of the user that is collected when the first user interface is displayed and operation data of the user that is collected when the second user interface is displayed. The electronic device is further configured to: obtain a first location and a second location, where the first location and the second location are obtained based on the operation data of the user that is collected when the head-mounted display device displays the first user interface; obtain a third location and a fourth location, where the third location and the fourth location are obtained based on the operation data of the user that is collected when the head-mounted display device displays the second user interface; and determine an offset $\Delta i1$ of an eye (for example, the left eye) of the user relative to the first straight line based on the first location and the second location, determine an offset $\Delta i2$ of an eye (for example, the right eye) of the user relative to the second straight line based on the third location and the fourth location, and obtain the IPD of the user based on $\Delta i1$ and $\Delta i2$. In this way, the user may indicate the foregoing locations by using the head-mounted display device, so that the electronic device measures the IPD of the user.

Herein, the head-mounted display device is configured to obtain an image of an eyeball of the user by using the operation data of the user that is collected when the first user interface is displayed. The head-mounted display device is further configured to obtain an image of an eyeball of the user by using the operation data of the user that is collected when the second user interface is displayed.

With reference to some embodiments of the first aspect, in some embodiments, the system further includes an input device. The input device is configured to send, to the electronic device, a user operation detected when the head-mounted display device displays the first user interface and a user operation detected when the head-mounted display device displays the second user interface. The electronic device is further configured to: obtain a first location and a second location, where the first location and the second location are obtained based on the user operation detected by the input device when the head-mounted display device displays the first user interface; obtain a third location and a fourth location, where the third location and the fourth location are obtained based on the user operation detected by the input device when the head-mounted display device displays the second user interface; and determine an offset $\Delta i1$ of an eye (for example, the left eye) of the user relative to the first straight line based on the first location and the second location, determine an offset $\Delta i2$ of an eye (for example, the right eye) of the user relative to the second straight line based on the third location and the fourth location, and obtain the IPD of the user based on $\Delta i1$ and $\Delta i2$. In this way, the user may indicate the foregoing locations by using the input device, so that the electronic device measures the IPD of the user.

In the foregoing embodiment, the first location is a location that is on a left side of the first display and at which the eye (for example, the left eye) of the user looks when the head-mounted display device displays the first user interface, the second location is a location that is on a right side of the first display and at which the eye (for example, the left eye) of the user looks when the head-mounted display device displays the first user interface, the third location is a location that is on a left side of the second display and at which the eye (for example, the right eye) of the user looks when the head-mounted display device displays the second user interface, and the fourth location is a location that is on a right side of the second display and at which the eye (for example, the right eye) of the user looks when the head-mounted display device displays the second user interface.

With reference to some embodiments of the first aspect, in some embodiments, the electronic device is in embodiments configured to calculate $\Delta i1$ according to the following formula:

$$\Delta i1 = \frac{M(JO' - KO')L}{2(M \times (JO' + KO') - L)}$$

JO' is a distance from the first location to the first straight line, KO' is a distance from the second location to the first straight line, M is a magnification of the first optical component, and L is a diameter of the first optical component; and when a value of $\Delta i1$ is positive, the eye (for example, the left eye) of the user offsets rightward relative to the first straight line; or when a value of $\Delta i1$ is negative, the eye (for example, the left eye) of the user offsets leftward relative to the first straight line.

With reference to some embodiments of the first aspect, in some embodiments, the electronic device is in embodiments configured to calculate $\Delta i2$ according to a formula similar to the foregoing formula. For example, the electronic device is in embodiments configured to calculate $\Delta i2$ according to the following formula:

$$\Delta i1 = \frac{m(jo' - ko')l}{2(m \times (jo' + ko') - l)}$$

jo' is a distance from the third location to the second straight line, ko' is a distance from the fourth location to the second straight line, m is a magnification of the second optical component, and l is a diameter of the second optical component; and when a value of $\Delta i2$ is positive, the eye (for example, the right eye) of the user offsets rightward relative to the second straight line; or when a value of $\Delta i2$ is negative, the eye (for example, the right eye) of the user offsets leftward relative to the second straight line.

With reference to some embodiments of the first aspect, in some embodiments, the electronic device is in embodiments configured to calculate the inter-pupillary distance IPD of the user according to the following formula:

$$IPD = IOD - \Delta i1 + \Delta i2$$

The IOD is a distance between the center of the first display and the center of the second display.

With reference to some embodiments of the first aspect, in some embodiments, the electronic device is in embodiments configured to: generate a first image and a second image based on the IPD of the user by using the source image; generate the first target image based on the first image, where a center of the first target image is obtained by adjusting a center of the first image by the offset $\Delta i1$; and generate the second target image based on the second image, where a center of the second target image is obtained by adjusting a center of the second image by the offset $\Delta i2$. In this way, when the head-mounted display device provides a game scenario or another similar scenario, the electronic device can correct the images displayed on the head-mounted display device, so that the user can comfortably and truly experience a 3D scenario when wearing the head-mounted display device.

With reference to some embodiments of the first aspect, in some embodiments, the source image includes a third image and a fourth image. The electronic device is in embodiments configured to: generate the first target image based on the third image, where a center of the first target image is obtained by adjusting a center of the third image by the offset $\Delta i1$; and generate the second target image based on the fourth image, where a center of the second target image is obtained by adjusting a center of the fourth image by the offset Δi2. In this way, when the head-mounted display device provides a 3D movie scenario or another similar scenario, the electronic device can correct the images displayed on the head-mounted display device, so that the user can comfortably and truly experience a 3D scenario when wearing the head-mounted display device. Herein, the third image and the fourth image may be two images that are captured by two cameras in advance and that have parallax for a same object.

According to a second aspect, an embodiment of this application provides a display method, applied to an electronic device. The method includes: The electronic device sends user interfaces to a head-mounted display device, where the user interfaces are configured to be displayed on displays of the head-mounted display device. The electronic device obtains an IPD of a user, where the IPD of the user is obtained based on user operations entered by the user based on the user interfaces. The electronic device obtains a source image, corrects the source image based on the IPD of the user to obtain target images, and sends the target images to the head-mounted display device, where the target images are configured to be displayed on the displays.

It may be understood that, based on a same inventive idea, for operations performed by the electronic device in the display method in the second aspect, refer to operations performed by the electronic device in the system in the first aspect when the electronic device implements corresponding functions. For details, refer to related descriptions.

According to the display method in the second aspect, the electronic device may cooperate with the head-mounted display device to provide a 3D scenario for the user, so that the user can comfortably and truly experience the 3D scenario when wearing the head-mounted display device.

With reference to the second aspect, in some embodiments, the displays include a first display and a second display, the head-mounted display device further includes a first optical component corresponding to the first display and a second optical component corresponding to the second display, a first straight line on which a center of the first display and a center of the first optical component are located is perpendicular to a third straight line, a second straight line on which a center of the second display and a center of the second optical component are located is perpendicular to the third straight line, and the third straight line is a straight line on which the center of the first optical component and the center of the second optical component are located. The user interfaces include a first user interface and a second user interface, the first user interface is configured to be displayed on the first display, and the second user interface is configured to be displayed on the second display. The target images include a first target image and a second target image, the first target image is used to be displayed on the first display, and the second target image is used to be displayed on the second display.

With reference to some embodiments of the second aspect, in some embodiments, the electronic device may obtain a first location, a second location, a third location, and a fourth location; and determine an offset Δi1 of an eye (for example, the left eye) of the user relative to the first straight line based on the first location and the second location, determine an offset Δi2 of an eye (for example, the right eye) of the user relative to the second straight line based on the third location and the fourth location, and obtain the IPD of the user based on Δi1 and Δi2. Herein, for the first location, the second location, the third location, and the fourth location, refer to related descriptions in the first aspect. The electronic device may obtain the first location, the second location, the third location, and the fourth location in the following several manners:

Manner 1: The electronic device receives the first location, the second location, the third location, and the fourth location that are sent by the head-mounted display device. Herein, the first location and the second location are obtained by the head-mounted display device based on an action performed by the user when the first user interface is displayed, and the third location and the fourth location are obtained by the head-mounted display device based on an action performed by the user when the second user interface is displayed. For the action performed by the user when the head-mounted display device displays the first user interface or the second user interface, refer to related descriptions in the first aspect.

Manner 2: The electronic device receives operation data of the user that is collected by the head-mounted display device when the head-mounted display device displays the first user interface and operation data of the user that is collected by the head-mounted display device when the head-mounted display device displays the second user interface. The electronic device obtains a first location and a second location, where the first location and the second location are obtained based on the operation data of the user that is collected when the head-mounted display device displays the first user interface; and obtains a third location and a fourth location, where the third location and the fourth location are obtained based on the operation data of the user that is collected when the head-mounted display device displays the second user interface. For the operation data of the user that is collected when the head-mounted display device displays the first user interface or the second user interface, refer to related descriptions in the first aspect.

Manner 3: The electronic device receives a user operation detected by an input device when the head-mounted display device displays the first user interface and a user operation detected by the input device when the head-mounted display device displays the second user interface. The electronic device obtains a first location and a second location, where the first location and the second location are obtained based on the user operation detected by the input device when the head-mounted display device displays the first user interface; and obtains a third location and a fourth location, where the third location and the fourth location are obtained based on the user operation detected by the input device when the head-mounted display device displays the second user interface. For the user operation detected by the input device when the head-mounted display device displays the first user interface or the second user interface, refer to related descriptions in the first aspect.

With reference to some embodiments of the second aspect, in some embodiments, the electronic device may calculate Δi1 according to the following formula:

$$\Delta i1 = \frac{M(JO' - KO')L}{2(M \times (JO' + KO') - L)}$$

JO' is a distance from the first location to the first straight line, KO' is a distance from the second location to the first straight line, M is a magnification of the first optical component, and L is a diameter of the first optical component; and when a value of Δi1 is positive, the eye (for example, the left eye) of the user offsets rightward relative to the first straight line; or when a value of Δi1 is negative, the eye (for example, the left eye) of the user offsets leftward relative to the first straight line.

With reference to some embodiments of the second aspect, in some embodiments, the electronic device may calculate Δi2 according to the following formula:

$$\Delta i1 = \frac{m(jo' - ko')l}{2(m \times (jo' + ko') - l)}$$

jo' is a distance from the third location to the second straight line, ko' is a distance from the fourth location to the second straight line, m is a magnification of the second optical component, and l is a diameter of the second optical component; and when a value of Δi2 is positive, the eye (for example, the right eye) of the user offsets rightward relative to the second straight line; or when a value of Δi2 is negative, the eye (for example, the right eye) of the user offsets leftward relative to the second straight line.

With reference to some embodiments of the second aspect, in some embodiments, the electronic device may calculate the inter-pupillary distance IPD of the user according to the following formula:

IPD=IOD−Δi1+Δi2

The inter-optics distance (IOD) is a distance between the center of the first display and the center of the second display.

With reference to some embodiments of the second aspect, in some embodiments, the electronic device may obtain the target images in the following manner: The electronic device generates a first image and a second image based on the IPD of the user by using the source image. The electronic device generates the first target image based on the first image, where a center of the first target image is obtained by adjusting a center of the first image by the offset Δi1. The electronic device generates the second target image based on the second image, where a center of the second target image is obtained by adjusting a center of the second image by the offset Δi2. In this way, when the head-mounted display device provides a game scenario or another similar scenario, the electronic device can correct the images displayed on the head-mounted display device, so that the user can comfortably and truly experience a 3D scenario when wearing the head-mounted display device.

With reference to some embodiments of the second aspect, in some embodiments, the source image includes a third image and a fourth image. The electronic device may obtain the target images in the following manner: The electronic device generates the first target image based on the third image, where a center of the first target image is obtained by adjusting a center of the third image by the offset Δi1. The electronic device generates the second target image based on the fourth image, where a center of the second target image is obtained by adjusting a center of the fourth image by the offset Δi2. In this way, when the head-mounted display device provides a 3D movie scenario or another similar scenario, the electronic device can correct the images displayed on the head-mounted display device, so that the user can comfortably and truly experience a 3D scenario when wearing the head-mounted display device. Herein, the third image and the fourth image may be two images that are captured by two cameras in advance and that have parallax for a same object.

According to a third aspect, an embodiment of this application provides a display method, applied to a head-mounted display device. The display method includes: The head-mounted display device displays user interfaces on displays. The head-mounted display device obtains an IPD of a user, where the IPD of the user is obtained based on user operations entered by the user based on the user interfaces. The head-mounted display device obtains a source image, corrects the source image based on the IPD of the user to obtain target images, and displays the target images on the displays.

According to the method in the third aspect, the head-mounted display device may measure the IPD of the user, and independently provide a 3D scenario for the user based on the IPD of the user, so that the user can comfortably and truly experience the 3D scenario when wearing the head-mounted display device.

With reference to the third aspect, in some embodiments, the displays include a first display and a second display, the head-mounted display device further includes a first optical component corresponding to the first display and a second optical component corresponding to the second display, a first straight line on which a center of the first display and a center of the first optical component are located is perpendicular to a third straight line, a second straight line on which a center of the second display and a center of the second optical component are located is perpendicular to the third straight line, and the third straight line is a straight line on which the center of the first optical component and the center of the second optical component are located. The user interfaces include a first user interface and a second user interface, the first user interface is displayed on the first display, and the second user interface is displayed on the second display. The target images include a first target image and a second target image, the first target image is displayed on the first display, and the second target image is displayed on the second display.

With reference to some embodiments of the third aspect, in some embodiments, the head-mounted display device may obtain a first location, a second location, a third location, and a fourth location; and determine an offset Δi1 of an eye (for example, the left eye) of the user relative to the first straight line based on the first location and the second location, determine an offset Δi2 of an eye (for example, the right eye) of the user relative to the second straight line based on the third location and the fourth location, and obtain the IPD of the user based on Δi1 and Δi2. Herein, for the first location, the second location, the third location, and the fourth location, refer to related descriptions in the first aspect. The head-mounted display device may obtain the first location, the second location, the third location, and the fourth location in the following several manners:

Manner 1: The head-mounted display device obtains the first location and the second location based on an action performed by the user when the first user interface is displayed, and obtains the third location and the fourth location based on an action performed by the user when the second user interface is displayed. For the action performed by the user when the head-mounted display device displays the first user interface or the second user interface, refer to related descriptions in the first aspect.

Manner 2: The head-mounted display device obtains the first location and the second location based on operation data of the user that is collected when the first user interface is displayed, and obtains the third location and the fourth location based on operation data of the user that is collected when the second user interface is displayed. For the operation data of the user that is collected when the head-mounted display device displays the first user interface or the second user interface, refer to related descriptions in the first aspect.

Manner 3: The head-mounted display device is connected to an input device, and the head-mounted display device obtains the first location and the second location based on a user operation detected by the input device when the head-mounted display device displays the first user interface, and obtains the third location and the fourth location based on a user operation detected by the input device when the head-mounted display device displays the second user interface. For the user operation detected by the input device when the head-mounted display device displays the first user interface or the second user interface, refer to related descriptions in the first aspect.

With reference to some embodiments of the third aspect, in some embodiments, the head-mounted display device calculates $\Delta i1$ according to the following formula:

$$\Delta i1 = \frac{M(JO' - KO')L}{2(M \times (JO' + KO') - L)}$$

JO' is a distance from the first location to the first straight line, KO' is a distance from the second location to the first straight line, M is a magnification of the first optical component, and L is a diameter of the first optical component; and when a value of $\Delta i1$ is positive, the eye (for example, the left eye) of the user offsets rightward relative to the first straight line; or when a value of $\Delta i1$ is negative, the eye (for example, the left eye) of the user offsets leftward relative to the first straight line.

With reference to some embodiments of the third aspect, in some embodiments, the head-mounted display device calculates $\Delta i2$ according to the following formula:

$$\Delta i1 = \frac{m(jo' - ko')l}{2(m \times (jo' + ko') - l)}$$

jo' is a distance from the third location to the second straight line, ko' is a distance from the fourth location to the second straight line, m is a magnification of the second optical component, and l is a diameter of the second optical component; and when a value of $\Delta i2$ is positive, the eye (for example, the right eye) of the user offsets rightward relative to the second straight line; or when a value of $\Delta i2$ is negative, the eye (for example, the right eye) of the user offsets leftward relative to the second straight line.

With reference to some embodiments of the third aspect, in some embodiments, the head-mounted display device calculates the inter-pupillary distance IPD of the user according to the following formula:

$$IPD = IOD - \Delta i1 + \Delta i2$$

The IOD is a distance between the center of the first display and the center of the second display.

With reference to some embodiments of the third aspect, in some embodiments, the head-mounted display device may generate a first image and a second image based on the IPD of the user by using the source image; generate the first target image based on the first image, where a center of the first target image is obtained by adjusting a center of the first image by the offset $\Delta i1$; and generate the second target image based on the second image, where a center of the second target image is obtained by adjusting a center of the second image by the offset $\Delta i2$. In this way, when providing a game scenario or another similar scenario, the head-mounted display device can correct the displayed images, so that the user can comfortably and truly experience a 3D scenario when wearing the head-mounted display device.

With reference to some embodiments of the third aspect, in some embodiments, the source image includes a third image and a fourth image. The head-mounted display device may generate the first target image based on the third image, where a center of the first target image is obtained by adjusting a center of the third image by the offset $\Delta i1$; and generate the second target image based on the fourth image, where a center of the second target image is obtained by adjusting a center of the fourth image by the offset $\Delta i2$. In this way, when providing a 3D movie scenario or another similar scenario, the head-mounted display device can correct the displayed images, so that the user can comfortably and truly experience the 3D scenario when wearing the head-mounted display device.

According to a fourth aspect, an embodiment of this application provides an electronic device. The electronic device includes one or more processors and a memory. The memory is coupled to the one or more processors. The memory is configured to store computer program code, and the computer program code includes computer instructions. The one or more processors invoke the computer instructions, so that the electronic device performs the display method according to any one of the second aspect or the implementations of the second aspect.

According to a fifth aspect, an embodiment of this application provides a head-mounted display device. The head-mounted display device includes one or more processors, a memory, and a display. The memory is coupled to the one or more processors. The memory is configured to store computer program code, and the computer program code includes computer instructions. The one or more processors invoke the computer instructions, so that the head-mounted display device performs the display method according to any one of the third aspect or the implementations of the third aspect.

With reference to the fifth aspect, in some embodiments, the displays include a first display and a second display, the head-mounted display device further includes a first optical component corresponding to the first display and a second optical component corresponding to the second display, a first straight line on which a center of the first display and a center of the first optical component are located is perpendicular to a third straight line, a second straight line on which a center of the second display and a center of the second optical component are located is perpendicular to the third straight line, and the third straight line is a straight line on which the center of the first optical component and the center of the second optical component are located.

According to a sixth aspect, an embodiment of this application provides a chip. The chip is applied to an electronic device. The chip includes one or more processors and an interface. The interface is configured to: receive code instructions and transmit the code instructions to the processor. The processor is configured to run the code instructions, so that the electronic device performs the display method according to any one of the second aspect or the possible implementations of the second aspect.

According to a seventh aspect, an embodiment of this application provides a computer program product including instructions. When the computer program product runs on an electronic device, the electronic device is enabled to perform the display method according to any one of the second aspect or the possible implementations of the second aspect.

According to an eighth aspect, an embodiment of this application provides a computer-readable storage medium, including instructions. When the instructions are run on an electronic device, the electronic device is enabled to perform the display method according to any one of the second aspect or the possible implementations of the second aspect.

According to a ninth aspect, an embodiment of this application provides a chip. The chip is applied to a head-mounted display device. The chip includes one or more processors and an interface. The interface is configured to: receive code instructions and transmit the code instructions to the processor. The processor is configured to run the code instructions, so that the head-mounted display device performs the display method according to any one of the third aspect or the possible implementations of the third aspect.

According to a tenth aspect, an embodiment of this application provides a computer program product including instructions. When the computer program product runs on a head-mounted display device, the head-mounted display device is enabled to perform the display method according to any one of the third aspect or the possible implementations of the third aspect.

According to an eleventh aspect, an embodiment of this application provides a computer-readable storage medium, including instructions. When the instructions are run on a head-mounted display device, the head-mounted display device is enabled to perform the display method according to any one of the third aspect or the possible implementations of the third aspect.

According to the technical solutions provided in embodiments of this application, the IPD of the user can be measured, and the images displayed on the head-mounted display device can be corrected based on the IPD of the user, so that the user can comfortably and truly experience a 3D scenario when wearing the head-mounted display device.

DESCRIPTION OF EMBODIMENTS

The following describes technical solutions in embodiments of this application with reference to accompanying drawings in embodiments of this application.

In the descriptions of embodiments of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

Terms "first" and "second" below are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, "a plurality of" means two or more unless otherwise specified.

Figure 1:
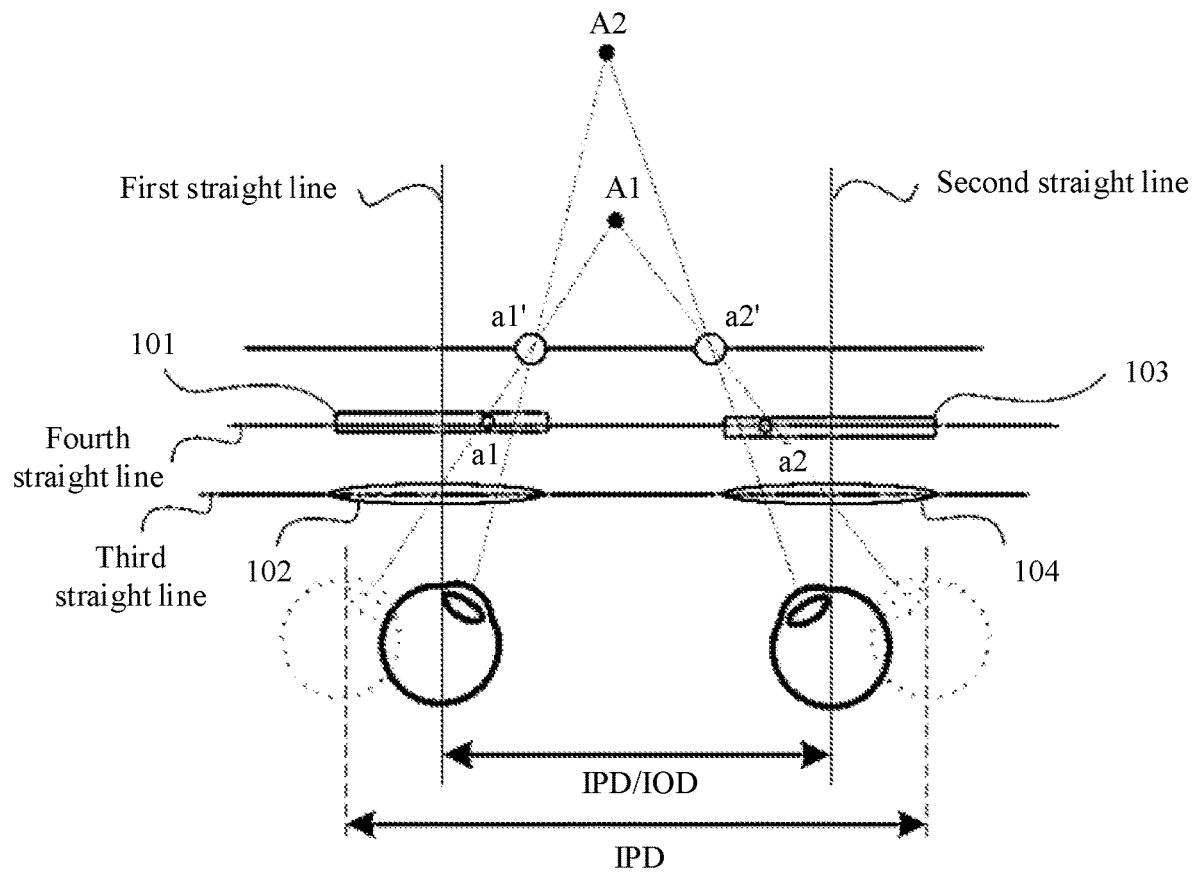
FIG. 1 is a schematic diagram of a principle in which a user experiences a 3D scenario by using a head-mounted display device according to an embodiment of this application.

FIG. 1 is a schematic diagram of a principle in which a user experiences a 3D scenario by using a head-mounted display device.

As shown in FIG. 1, the head-mounted display device may include a display 101, an optical component 102, a display 103, and an optical component 104. A material, a size, resolution, and the like of the display 101 are the same as those of the display 103. A material, a structure, and the like of the optical component 102 are the same as those of the optical component 104. The optical component 102 and the optical component 104 each include one or more lenses, and the lens may include one or more of a convex lens, a Fresnel lens, and a lens of another type.

In embodiments of this application, a first display may be the display 101, a second display may be the display 103, a first optical component may be the optical component 102, and a second optical component may be the optical component 104. The display 101, the display 103, the optical component 102, and the optical component 104 are used as examples for description in the following embodiments.

A first straight line on which a center of the display 101 and a center of the optical component 102 are located is perpendicular to a third straight line on which the center of the optical component 102 and a center of the optical component 104 are located. The display 101 and the optical component 102 correspond to the left eye of the user. When the user wears the head-mounted display device, the display 101 may display an image a1. After light emitted when the display 101 displays the image a1 is transmitted by the optical component 102, a virtual image a1' of the image a1 is formed in front of the left eye of the user.

A second straight line on which a center of the display 103 and the center of the optical component 104 are located is perpendicular to the third straight line on which the center of the optical component 102 and the center of the optical component 104 are located. The display 103 and the optical component 104 correspond to the right eye of the user. When the user wears the head-mounted display device, the display 103 may display an image a2. After light emitted when the display 103 displays the image a2 is transmitted by the optical component 104, a virtual image a2' of the image a2 is formed in front of the right eye of the user.

In this embodiment of this application, the center of the display may be a symmetric center of the display, for example, a circle center of a circular display or a symmetric center of a rectangular display. The center of the optical component may be an optical center, and usually, the optical center is also a symmetric center of the optical component.

In this embodiment of this application, a fourth straight line may be a straight line on which the center of the display 101 and the center of the display 103 are located.

The image a1 and the image a2 are two images that have parallax for a same object, for example, an object a. The parallax is a difference between locations of a same object in a field of view when the object is observed from two points with a specific distance. The virtual image a1' and the virtual image a2' are located on a same plane, and the plane may be referred to as a virtual image plane.

When the head-mounted display device is worn, the left eye of the user focuses on the virtual image a1', and the right eye of the user focuses on the virtual image a2'. Then, the virtual image a1' and the virtual image a2' are superimposed into a complete and stereoscopic image in the brain of the user, and this process is referred to as convergence. In the convergence process, an intersection point of lines of sight of the two eyes is considered by the user as an actual location of the object described by the image a1 and the image a2. Due to the convergence process, the user can experience the 3D scenario provided by the head-mounted display device.

Based on the principle of experiencing the 3D scenario by the user shown in FIG. 1, the following describes a manner in which the head-mounted display device generates the images displayed on the display 101 and the display 103.

Usually, the head-mounted display device makes the following assumption: When the user wears the head-mounted display device, a pupil center of the left eye, the center of the display 101, and the center of the optical component 102 are located on the same straight line, and a pupil center of the right eye, the center of the display 103, and the center of the optical component 104 are located on the same straight line. In embodiments, the head-mounted display device assumes that an IPD of the user is equal to a distance between the center of the display 101 and the center of the display 103, and is also equal to a distance (IOD) between the center of the optical component 102 and the center of the optical component 104.

Based on the assumption, the head-mounted display device generates the images displayed on the display 101 and the display 103. In embodiments, the head-mounted display device first obtains 3D scenario information, and constructs a 3D scenario based on the 3D scenario information. The 3D scenario information describes some information about a 3D scenario that is expected to be experienced by the user, that is, the 3D scenario information indicates an object that can be seen by the user when the user is in the 3D scenario and relative locations of each object and the user. Then, the head-mounted display device may simulate or assume that the user whose IPD is equal to the IOD is naturally in the constructed 3D scenario, obtain an image seen by the left eye of the user, and display the image on the display 101; and obtain an image seen by the right eye of the user, and display the image on the display 103. In some embodiments, the head-mounted display device may obtain, by using two virtual cameras, the images displayed on the display 101 and the display 103. For example, the head-mounted display device places the two virtual cameras in the constructed 3D scenario and assumes that the user whose IPD is equal to the IOD is naturally in the 3D scenario. One virtual camera is located at a location of the left eye of the user, and is configured to obtain an image seen by the user when the user watches the 3D scenario from the location, where the image is the image seen by the left eye of the user. The other virtual camera is located at a location of the right eye of the user, and is configured to obtain an image seen by the user when the user watches the 3D scenario from the location, where the image is the image seen by the right eye of the user. A spacing between the two virtual cameras is the same as an assumed IPD of the user, that is, is equal to the IOD. The virtual camera is a virtual concept, and is not actual hardware.

After the head-mounted display device generates the images based on the assumption and displays the images on the displays, when the user whose IPD is equal to the IOD wears the head-mounted display device, the head-mounted display device may provide the user with a sense of reality and immersion of the 3D scenario. In this way, a natural and comfortable convergence process can be further enabled when the user watches an object in the 3D scenario, and a 3D scenario actually experienced by the user after convergence is consistent with the 3D scenario constructed by the head-mounted display device.

Based on the foregoing described manner in which the head-mounted display device generates the images displayed on the display 101 and the display 103, the following describes, with reference to FIG. 1, how the IPD affects user perception of the 3D scenario provided by the head-mounted display device.

Refer to FIG. 1. The head-mounted display device displays the image a1 on the display 101, and displays the image a2 on the display 103. For manners of generating the image a1 and the image a2, refer to the foregoing related descriptions.

Refer to solid-line eyeballs in FIG. 1. When the IPD of the user is equal to the IOD, the left eye of the user rotates rightward and focuses on the virtual image a1', and the right eye rotates leftward and focuses on the virtual image a2', to complete convergence. In this case, convergence is natural, comfortable, and easy for the user. In addition, a location of a point A1 relative to the user in the figure is considered by the user as a location of the object a relative to the user.

Herein, a 3D scenario actually experienced by the user is consistent with the 3D scenario constructed by the head-mounted display device.

Refer to dotted-line eyeballs in FIG. 1. When the IPD of the user is not equal to the IOD, for example, when the IPD of the user is greater than the IOD, the left eye of the user rotates rightward and focuses on the virtual image a1', and the right eye of the user rotates leftward and focuses on the virtual image a2', to complete convergence. A rotation angle of each of the eyeballs that exists when the dotted-line eyeballs converge is different from a rotation angle of each of the eyeballs that exists when the solid-line eyeballs converge. Therefore, the convergence process is not necessarily natural and comfortable for the user. In addition, when the IPD of the user is not equal to the IOD, a location of a point A2 relative to the user in the figure is considered by the user as a location of the object a relative to the user. Therefore, if the IPD of the user is not equal to the IOD, the 3D scenario experienced by the user is inconsistent with the 3D scenario constructed by the head-mounted display device, and distortion occurs.

An embodiment of this application provides a display method, so that a user can comfortably, easily, and naturally perform convergence when wearing the head-mounted display device, and a 3D scenario actually experienced by the user is consistent with a scenario constructed by the head-mounted display device. In the display method, images displayed on the head-mounted display device are determined based on an IPD of the user. In this way, the user can comfortably and truly experience the 3D scenario constructed by an electronic device. For embodiments of the method, refer to related descriptions in subsequent embodiments. Details are not described herein.

The following first describes a system and an apparatus provided in embodiments of this application, to describe the display method provided in embodiments of this application more clearly.

Figure 2:
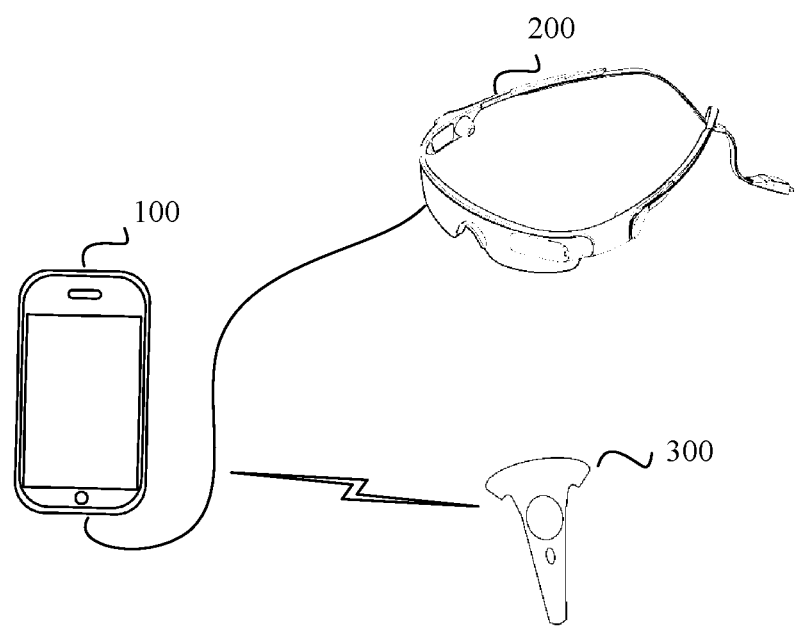
FIG. 2 is a schematic diagram of an architecture of a system according to an embodiment of this application.

FIG. 2 shows an example of a system 10 according to an embodiment of this application. The system 10 may display an image by using technologies such as VR, augmented reality (AR), and mixed reality (MR), so that a user experiences a 3D scenario, and VR/AR/MR experience is provided for the user.

As shown in FIG. 2, the system 10 may include an electronic device 100, a head-mounted display device 200, and an input device 300. The head-mounted display device 200 is worn on the head of a user, and the input device 300 is handheld by the user. It may be understood that the input device 300 is optional, that is, the system 10 may not include the input device 300.

The electronic device 100 and the head-mounted display device 200 may be wiredly or wirelessly connected. The wired connection may include a wired connection for communication through an interface such as a USB port or an HDMI interface. The wireless connection may include one or more of wireless connections for communication by using a technology such as Bluetooth, Wi-Fi Direct (such as Wi-Fi p2p), Wi-Fi softAP, Wi-Fi LAN, or radio frequency.

The electronic device 100 and the input device 300 may be wirelessly connected and communicate with each other by using a short-distance transmission technology such as Bluetooth (BT), near field communication (NFC), or Zig-Bee, and may be further wiredly connected and communicate with each other through a USB port, an HDMI interface, a user-defined interface, or the like.

The electronic device 100 may be a portable terminal device with iOS, Android, Microsoft, or another operating system, for example, a mobile phone or a tablet computer, or may be a non-portable terminal device such as a laptop computer with a touch-sensitive surface or a touch panel, or a desktop computer with a touch-sensitive surface or a touch panel. The electronic device 100 may run an application to generate images to be transmitted to the head-mounted display device 200 for displaying. The application may be, for example, a video application, a game application, or a desktop application.

Embodiments of implementable forms of the head-mounted display device 200 include electronic apparatuses such as a helmet, glasses, and a headset that can be worn on the head of the user. The head-mounted display device 200 is configured to display images, to present a 3D scenario to the user, and bring VR/AR/MR experience to the user. The 3D scenario may include a 3D image, a 3D video, audio, and the like.

The input device 300 may be implemented as a physical device, such as a physical handle, mouse, keyboard, stylus, band, or the like, or may be implemented as a virtual device, such as a virtual keyboard that is generated by the electronic device 100 and that is displayed by the head-mounted display device 200.

When the input device 300 is the physical device, the input device 300 may be provided with a plurality of sensors, for example, an acceleration sensor, a gyro sensor, a magnetic sensor, and a pressure sensor. The pressure sensor may be disposed under an OK button of the input device 300. The OK button may be a physical button or a virtual button.

The input device 300 is configured to collect motion data of the input device 300 and data that indicates whether the OK button of the input device 300 is pressed. The motion data includes an acceleration that is of the input device 300 and that is collected by the sensor of the input device 300, for example, the acceleration sensor, a motion speed that is of the input device 300 and that is collected by the gyro sensor, and the like. The data that indicates whether the OK button of the input device 300 is pressed includes a pressure value collected by the pressure sensor disposed under the OK button, a level generated by the input device 300, and the like. If the pressure value collected by the pressure sensor disposed under the OK button is 0, it indicates that the OK button of the input device 300 is pressed. If the pressure value collected by the pressure sensor disposed under the OK button is not 0, it indicates that the OK button of the input device 300 is not pressed. In some embodiments, a high level generated by the input device 300 indicates that the OK button of the input device 300 is pressed, and a low level generated by the input device 300 indicates that the OK button of the input device 300 is not pressed.

The input device 300 may send the collected motion data of the input device 300 and the data that indicates whether the OK button of the input device 300 is pressed to the electronic device 100 for analysis. The electronic device 100 may determine a motion status and a status of the input device 300 based on the data collected by the input device 300. The motion status of the input device 300 may include but is not limited to whether the input device 300 moves, a movement direction, a movement speed, a movement distance, a movement track, and the like. The status of the input device 300 may include whether the OK button of the input device 300 is pressed. The electronic device 100 may adjust, based on the motion status and/or the status of the input device 300, images displayed on the head-mounted display device 200 and/or enable a corresponding function. For example, the electronic device 100 moves a cursor in the image, where a movement track of the cursor is determined based on the motion status of the input device 300. For another example, the electronic device 100 enables an IPD measurement function based on an operation of pressing the OK button of the input device 300.

In embodiments, the user may enter a user operation on the input device 300 to trigger the electronic device 100 to perform a corresponding function. For example, when the user holds the input device 300 and moves the input device 300 leftward by 3 cm, the electronic device 100 moves a cursor displayed on the head-mounted display device 200 leftward by 6 cm. In this way, the user can move the cursor to any location on a display of the head-mounted display device 200 by controlling the input device 300. For another example, after a cursor is moved to a control displayed on the head-mounted display device 200, the user may press the OK button of the input device 300, so that the electronic device 100 enables a function corresponding to the control.

In this embodiment of this application, the head-mounted display device 200 is configured to display images. After seeing the images displayed by the head-mounted display device 200, the user may enter a user operation on the input device 300 or the head-mounted display device 200 to indicate edges that can be seen by the user on the displays of the head-mounted display device 200. For a manner in which the user enters the user operation on the head-mounted display device 200, refer to subsequent related descriptions of the head-mounted display device 200. Details are not described herein. The head-mounted display device 200 or the input device 300 may send collected data to the electronic device 100, and the electronic device 100 performs calculation based on the data to determine the edges that can be seen by the user on the displays of the head-mounted display device 200, and calculates an IPD of the user based on the edges.

After obtaining the IPD of the user, the electronic device 100 may determine, based on the IPD of the user, the images to be displayed on the head-mounted display device 200, and display the images on the displays of the head-mounted display device 200. In this way, a natural and comfortable convergence process can be enabled when the user watches an object in the 3D scenario, and a 3D scenario actually experienced by the user after convergence is consistent with the 3D scenario constructed by the electronic device, to improve wearing comfort of the user, and avoid scenario distortion.

Herein, for a manner in which the user indicates the edges that can be seen by the user on the displays of the head-mounted display device 200, a manner in which the electronic device 100 calculates the IPD of the user, and a manner in which the electronic device 100 determines the images displayed on the head-mounted display device 200 and displays the images on the head-mounted display device 200, refer to related descriptions in subsequent method embodiments. Details are not described herein.

Figure 3A:
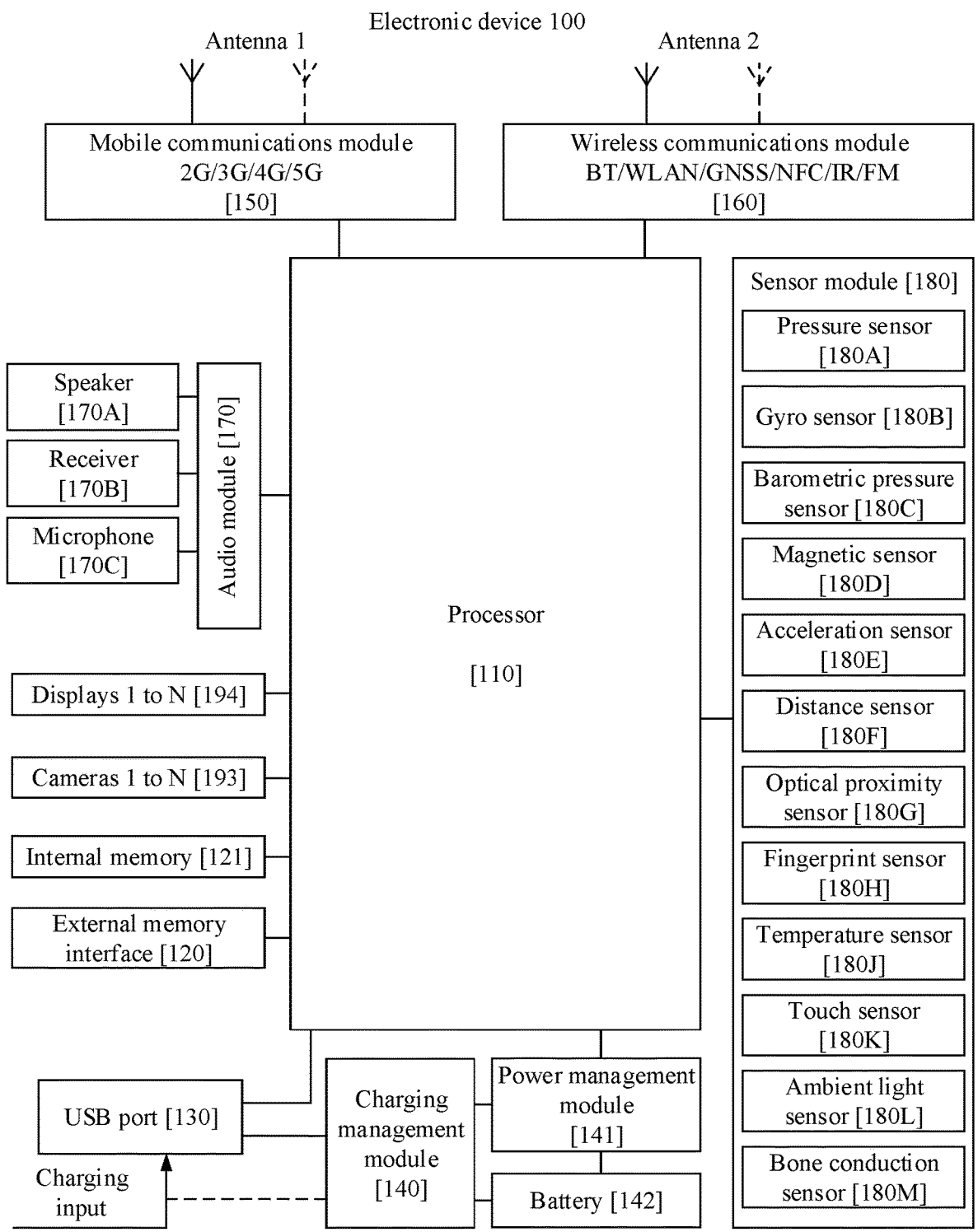
FIG. 3A is a schematic diagram of a hardware structure of an electronic device according to an embodiment of this application.

FIG. 3A is a schematic diagram of a structure of the electronic device 100 according to an embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a sensor module 180, a camera 193, and a display 194. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or may combine some components, or may split some components, or may have different component arrangements. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronous serial bus, including a serial data line (SDA) and a serial clock line (SCL).

The I2S interface may be used for audio communication. In some embodiments, the processor 110 may include a plurality of groups of I2S buses.

The PCM interface may also be configured to: perform audio communication, and sample, quantize, and code an analog signal.

The UART interface is a universal serial data bus, and is used for asynchronous communication. The bus may be a two-way communications bus. The bus converts to-be-transmitted data between serial communication and parallel communication.

The MIPI interface may be configured to connect the processor 110 to a peripheral component such as the display 194 or the camera 193.

The GPIO interface may be configured by using software. The GPIO interface may be configured as a control signal or a data signal.

The USB port 130 is a port that conforms to a USB standard specification, and may be in embodiments a mini USB port, a micro USB port, a USB Type-C port, or the like. The USB port 130 may be configured to connect to the charger to charge the electronic device 100, or may be configured to transmit data between the electronic device 100 and a peripheral device, or may be configured to connect to a headset, to play audio by using the headset. Alternatively, the port may be configured to connect to another head-mounted display device, for example, a VR device.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger.

The power management module 141 is configured to connect the battery 142 and the charging management module 140 to the processor 110.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more devices integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to: compress or decompress a digital video. The electronic device 100 may support one or more video codecs. Therefore, the electronic device 100 can play or record videos of a plurality of coding formats, for example, moving picture experts group (moving picture experts group, MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning.

The external memory interface 120 may be configured to connect to an external storage card, for example, a micro SD card, to extend a storage capability of the electronic device 100.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data and an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (UFS). The processor 110 runs instructions stored in the internal memory 121 and/or instructions stored in the memory disposed in the processor, to perform various function applications and data processing of the electronic device 100.

The electronic device 100 may implement audio functions, for example, music playing and recording, by using the audio module 170, the speaker 170A, the receiver 170B, the microphone 170C, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is received by using the electronic device 100, the receiver 170B may be put close to a human ear to listen to a voice.

The microphone 170C, also referred to as a "mike" or a "mic", is configured to convert a sound signal into an electrical signal.

The pressure sensor 180A is configured to sense a pressure signal, and may convert the pressure signal into an electrical signal. In some embodiments, the pressure sensor 180A may be disposed on the display 194. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to perform image stabilization during photographing.

The barometric pressure sensor 180C is configured to measure barometric pressure.

The magnetic sensor 180D includes a Hall effect sensor.

The acceleration sensor 180E may detect magnitudes of accelerations of the electronic device 100 in various directions (usually on three axes). When the electronic device 100 is still, a magnitude and a direction of gravity may be detected.

The distance sensor 180F is configured to measure a distance. The electronic device 100 may measure the distance in an infrared manner or a laser manner.

The optical proximity sensor 180G may include, for example, a light-emitting diode (LED) and an optical detector such as a photodiode. The light-emitting diode may be an infrared light-emitting diode.

The ambient light sensor 180L is configured to sense ambient light brightness. The electronic device 100 may adaptively adjust brightness of the display 194 based on the sensed ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from that of the display 194.

The bone conduction sensor 180M may obtain a vibration signal.

In this embodiment of this application, the internal memory 121 is configured to store one or more applications, and the application includes instructions. When the application is executed by the processor 110, the electronic device 100 generates content to be presented to a user. For example, the application may include an application used to manage the head-mounted display device 200, a game application, a conference application, a video application, a home screen application, another application, or the like.

In this embodiment of this application, the processor 110 is configured to determine, based on data collected by the head-mounted display device 200 or the input device 300, edges that can be seen by the user on displays of the head-mounted display device 200. The processor 110 is further configured to calculate an IPD of the user based on the edges that can be seen by the user on the displays of the head-mounted display device 200. For a manner in which the processor 110 determines the edges that can be seen by the user on the displays of the head-mounted display device 200 and a manner in which the processor 110 calculates the IPD of the user, refer to descriptions in subsequent embodiments.

In this embodiment of this application, the GPU is configured to: perform mathematical and geometric operations based on data obtained from the processor 110 (for example, data provided by the application), render an image by using a computer graphics technology, a computer simulation technology, and the like, and determine images to be displayed on the head-mounted display device 200. In some embodiments, the GPU may add correction or pre-distortion to an image rendering process to compensate for or correct distortion caused by an optical component of the head-mounted display device 200.

In some embodiments, the GPU is further configured to determine, based on the IPD of the user that is obtained from the processor 110, images to be displayed on the head-mounted display device 200. For a manner in which the GPU determines the images displayed on the head-mounted display device 200, refer to related descriptions in subsequent embodiments. Details are not described herein.

In this embodiment of this application, the electronic device 100 may send, to the head-mounted display device 200 by using the mobile communications module 150, the wireless communications module 160, or a wired interface, images obtained by the GPU through processing.

A software system of the electronic device 100 may use a layered architecture, an event-driven architecture, a micro-kernel architecture, a micro service architecture, or a cloud architecture. In this embodiment of this application, an Android system of a layered architecture is used as an example to describe a software structure of the electronic device 100.

Figure 3B:
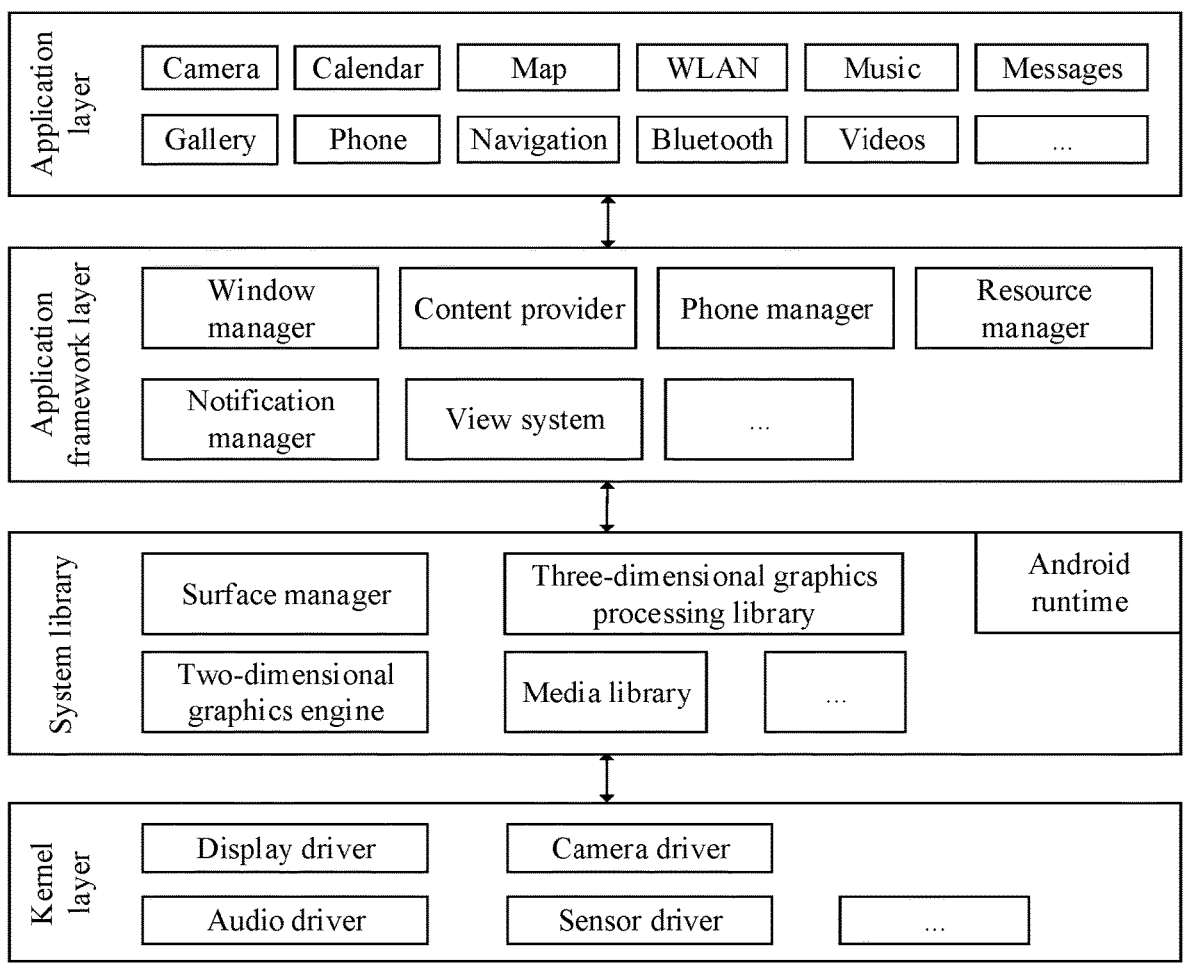
FIG. 3B is a schematic diagram of a software structure of an electronic device according to an embodiment of this application.

FIG. 3B is a block diagram of the software structure of the electronic device 100 according to an embodiment of this application.

In the layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 3B, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3B, the application framework layer may include a window manager, a content provider, a view system, a phone manager, a resource manager, a notification manager, a display manager, an activity manager, an input manager, and the like.

The window manager is configured to manage a window program. The window manager may obtain a size of a display, determine whether there is a status bar, lock a screen, take a screenshot, and the like. In this embodiment of this application, the window manager, the display manager, and the activity manager may cooperate to generate images to be displayed on the head-mounted display device 200.

The content provider is configured to: store and obtain data, and enable the data to be accessed by an application. The data may include a video, an image, audio, calls that are made and received, a browsing history and a bookmark, an address book, and the like.

The view system includes visual controls such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, or the like).

The resource manager provides various resources for an application such as a localized character string, an icon, a picture, a layout file, and a video file.

The notification manager enables an application to display notification information in a status bar, and may be configured to convey a notification message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, the head-mounted display device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer are run in the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3C:
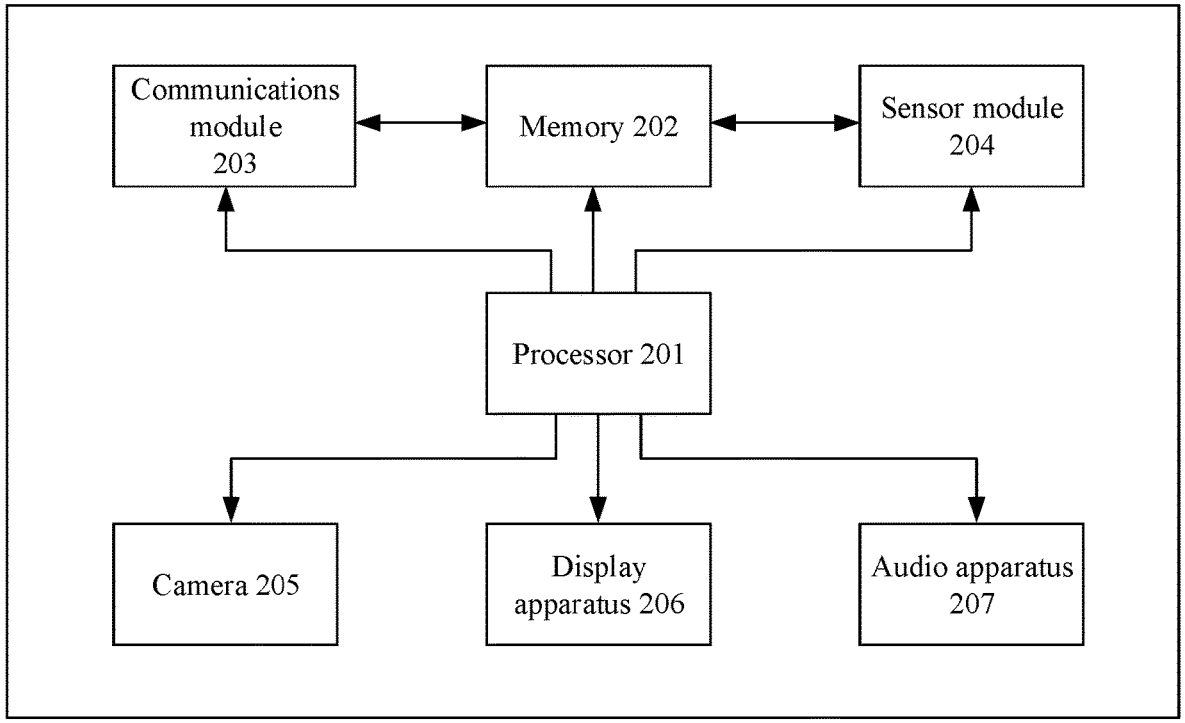
FIG. 3C is a schematic diagram of a structure of a head-mounted display device according to an embodiment of this application.

Refer to FIG. 3C. The head-mounted display device 200 may include a processor 201, a memory 202, a communications module 203, a sensor system 204, a camera 205, a display apparatus 206, and an audio apparatus 207. The foregoing components may be coupled and connected and communicate with each other.

It may be understood that a structure shown in FIG. 3C does not constitute a specific limitation on the head-mounted display device 200. In some other embodiments of this application, the head-mounted display device 200 may include more or fewer components than those shown in the figure, or combine some components, or split some components, or have different component arrangements. For example, the head-mounted display device 200 may further include physical buttons such as a power button and a volume button, and various interfaces such as a USB port configured to support a connection between the head-mounted display device 200 and the electronic device 100. The components shown in the figure may be implemented by hardware, software, or a combination of software and hardware.

The processor 201 may include one or more processing units. For example, the processor 201 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. The controller may generate an operation control signal based on an instruction operation code and a time sequence signal, to complete control of instruction fetching and instruction execution, so that each component performs a corresponding function, for example, human-computer interaction, motion tracking/prediction, rendering and display, and audio processing.

The memory 202 stores executable program code used to perform the display method provided in embodiments of this application. The executable program code includes instructions. The memory 202 may include a program storage area and a data storage area. The program storage area may store an operating system, an application required by at least one function (for example, a sound playing function or an image playing function), and the like. The data storage area may store data (for example, audio data) created during use of the head-mounted display device 200, and the like. In addition, the memory 202 may include a high-speed random access memory, and may further include a nonvolatile memory, for example, at least one magnetic disk storage device, a flash memory device, or a universal flash storage (UFS). The processor 201 runs instructions stored in the memory 202 and/or instructions stored in the memory disposed in the processor, to perform various function applications and data processing of the head-mounted display device 200.

The communications module 203 may include a wireless communications module. The wireless communications module may provide a wireless communication solution that includes a WLAN, BT, a GNSS, FM, IR, or the like and that is applied to the head-mounted display device 200. The wireless communications module may be one or more devices integrating at least one communications processor module. The communications module 203 may support the head-mounted display device 200 in communicating with the electronic device 100. It may be understood that in some embodiments, the head-mounted display device 200 may not include the communications module 203. This is not limited in this embodiment of this application.

The sensor system 204 may include an accelerometer, a compass, a gyro, a magnetometer, another sensor configured to detect motion, or the like. The sensor system 204 is configured to collect corresponding data. For example, an acceleration sensor collects an acceleration of the head-mounted display device 200, and a gyro sensor collects a motion speed of the head-mounted display device 200. The data collected by the sensor system 204 may reflect a motion status of the head of the user wearing the head-mounted display device 200. In some embodiments, the sensor system 204 may be an inertial measurement unit (IMU) disposed in the head-mounted display device 200. In some embodiments, the head-mounted display device 200 may send the data obtained by the sensor system to the electronic device 100 for analysis. The electronic device 100 may determine a motion status of the head of the user based on data collected by each sensor, and perform a corresponding function based on the motion status of the head of the user, for example, enable an IPD measurement function. In embodiments, the user may enter a head motion operation on the head-mounted display device 200 to trigger the electronic device 100 to perform a corresponding function. The motion status of the head of the user may include whether the head of the user rotates, a rotation direction, and the like.

The sensor system 204 may further include an optical sensor, configured to: track an eye location of the user and capture eyeball motion data in combination with the camera 205. The eyeball motion data may be, for example, used to determine an eye spacing of the user, a 3D location of each eye relative to the head-mounted display device 200, an amplitude of torsion and rotation (that is, pitching and shaking) of each eye, and a gaze direction. In an example, infrared light is emitted inside the head-mounted display device 200 and reflected from each eye, reflected light is detected by the camera 205 or the optical sensor, and detected data is transmitted to the electronic device 100, so that the electronic device 100 analyzes a location, a pupil diameter, a motion status, and the like of the eye of the user based on a change of the infrared light reflected from each eye.

The camera 205 may be configured to capture a static image or a video. The static image or the video may be an external-oriented image or video around a user, or may be an internal-oriented image or video. The camera 205 may track movement of a single eye or both eyes of the user. The camera 205 includes but is not limited to a conventional color camera (RGB camera), a depth camera (RGB depth camera), a dynamic vision sensor (DVS) camera, and the like. The depth camera may obtain depth information of a photographed object. In some embodiments, the camera 205 may be configured to: capture an image of an eye of the user, and send the image to the electronic device 100 for analysis. The electronic device 100 may determine a status of the eye of the user based on the image collected by the camera 205, and perform a corresponding function based on the status of the eye of the user. In embodiments, the user may enter an eye motion operation on the head-mounted display device 200 to trigger the electronic device 100 to perform a corresponding function. The status of the eye of the user may include whether the eye of the user rotates, a rotation direction, whether the eye of the user does not rotate for a long time, an angle of looking at the outside, and the like.

The head-mounted display device 200 presents or displays images by using a GPU, the display apparatus 206, an application processor, and the like.

The GPU is a microprocessor for image processing, and is connected to the display apparatus 206 and the application processor. The processor 110 may include one or more GPUs that execute program instructions to generate or change display information.

The display apparatus 206 may include one or more displays and one or more optical components. The one or more displays include the display 101 and the display 103. The one or more optical components include the optical component 102 and the optical component 104. Herein, for structures of the display 101, the display 103, the optical component 102, and the optical component 104 and a location relationship between the display 101, the display 103, the optical component 102, and the optical component 104, refer to related descriptions in FIG. 1. In subsequent method embodiments, for ease of description, reference numerals in FIG. 1 are still used for reference numerals of components in the display apparatus 206 of the head-mounted display device 200, that is, the head-mounted display device 200 includes the display 101, the display 103, the optical component 102, and the optical component 104.

In this embodiment of this application, a display of the head-mounted display device 200, for example, the display 101 or the display 103, is configured to: receive data or content (for example, a rendered image) processed by the GPU of the electronic device 100, and display the data or the content. In this case, the head-mounted display device 200 may be a terminal device such as VR glasses with a limited computing capability, and needs to cooperate with the head-mounted display device 200 to present a 3D scenario to the user, so as to provide VR/AR/MR experience for the user.

The images displayed on the display 101 and the display 103 have parallax, to simulate binocular vision, so that the user can feel a depth of an object corresponding to the images, to generate a real 3D sense.

The display, for example, the display 101 or the display 103, may include a display panel. The display panel may be configured to display an image, to present a stereoscopic virtual scenario to the user. The display panel may be a liquid crystal display LCD, an OLED, an AMOLED, an FLED, a mini-LED, a micro-LED, a micro-OLED, a QLED, or the like.

The optical component, for example, the optical component 102 or the optical component 104, is configured to guide light from the display to an exit pupil for user perception. In some implementations, one or more optical elements (for example, lenses) in the optical component may have one or more coatings, such as an anti-reflection coating. Magnification of the optical component for image light allows the display to be physically smaller and lighter, and consume lower power. In addition, the magnification for the image light may extend a field of view of content displayed on the display. For example, the optical component may enable the field of view of the content displayed on the display to be an entire field of view of the user.

The optical component may be further configured to correct one or more optical errors. Examples of the optical errors include barrel distortion, pincushion distortion, longitudinal chromatic aberration, lateral chromatic aberration, spherical aberration, comet aberration, field curvature, astigmatism, and the like. In some implementations, content provided to the display for displaying is pre-distorted, and the distortion is corrected by the optical component when the optical component receives image light generated based on the content from the display.

The audio apparatus 207 is configured to: collect and output audio. The audio apparatus 207 may include but is not limited to a microphone, a speaker, a headset, and the like.

Based on the system 10 described in the embodiment in FIG. 2, the electronic device 100 described in the embodiments in FIG. 3A and FIG. 3B, and the head-mounted display device 200 described in the embodiment in FIG. 3C, the following describes, in detail by using an example in which the electronic device 100 and the head-mounted display device 200 cooperate to provide a 3D scenario, a display method provided in embodiments of this application.

In the display method, when a user wears the head-mounted display device 200, the electronic device 100 may determine an IPD of the user, determine, based on the IPD of the user, images to be displayed on the head-mounted display device 200, and display the images on the head-mounted display device 200. According to the display method, when the images are displayed on the head-mounted display device 200, the IPD of the user is considered. In this way, a natural and comfortable convergence process is enabled when the user watches an object in the 3D scenario, and a 3D scenario actually experienced by the user after convergence is consistent with the 3D scenario constructed by the electronic device, to improve wearing comfort of the user, and avoid scenario distortion. In subsequent embodiments, the display method is described in detail by using the following three parts (I), (II), and (III).

(I) The electronic device 100 obtains an IPD of a user.

The electronic device 100 may calculate the IPD of the user based on leftmost edges and rightmost edges that can be seen by the user on displays of the head-mounted display device. In the head-mounted display device 200, relative locations of the displays, optical components, and tubes are determined, and the IPD is a main factor that affects the leftmost edges and the rightmost edges that can be seen by the user on the displays. Therefore, the electronic device 100 may obtain the IPD of the user based on the leftmost edges and the rightmost edges that can be seen by the user on the displays of the head-mounted display device 200.

Figure 4A:
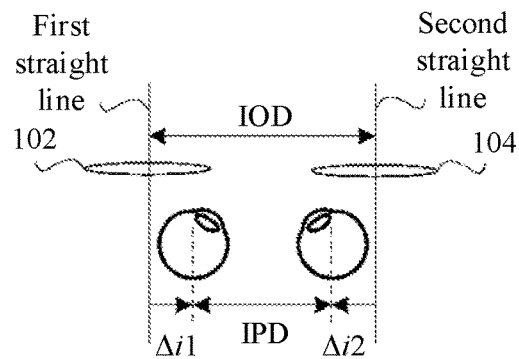
FIG. 4A and FIG. 4B each are a schematic diagram of a location relationship between each of two eyes of a user and each of optical components of a head-mounted display device according to an embodiment of this application.

FIG. 4A is a diagram of an example of a location relationship between each of two eyes and each of the optical component 102 and the optical component 104 when a user whose IPD is less than an IOD wears the head-mounted display device 200.

Figure 4B:
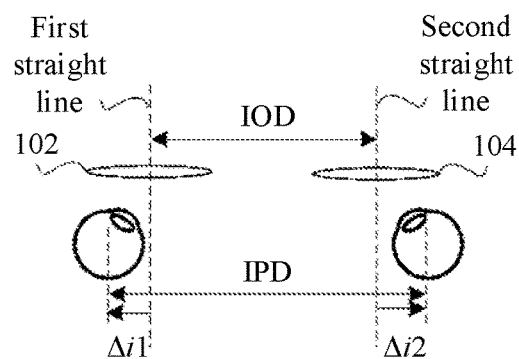

FIG. 4B is a diagram of an example of a location relationship between each of two eyes and each of the optical component 102 and the optical component 104 when a user whose IPD is greater than an IOD wears the head-mounted display device 200.

As shown in FIG. 4A and FIG. 4B, when the user wears the head-mounted display device 200, an offset of the left eye of the user relative to the first straight line may be referred to as $\Delta i1$, where $\Delta i1$ is a value with a sign. A distance between the left eye of the user and the first straight line is equal to an absolute value of $\Delta i1$. In some embodiments of this application, the following assumption may be made: When $\Delta i1$ is a positive value, it indicates that the left eye of the user offsets rightward relative to the first straight line; or when $\Delta i1$ is a negative value, it indicates that the left eye of the user offsets leftward relative to the first straight line. In some other embodiments, another assumption may also be made. This is not limited in embodiments of this application.

As shown in FIG. 4A and FIG. 4B, when the user wears the head-mounted display device 200, an offset of the right eye of the user relative to the second straight line may be referred to as $\Delta i1$, where $\Delta i2$ is a value with a sign. A distance between the right eye of the user and the second straight line is equal to an absolute value of $\Delta i2$. In some embodiments of this application, the following assumption may be made: When $\Delta i2$ is a positive value, it indicates that the right eye of the user offsets rightward relative to the second straight line; or when $\Delta i2$ is a negative value, it indicates that the right eye of the user offsets leftward relative to the second straight line. In some other embodiments, another assumption may also be made. This is not limited in embodiments of this application.

It can be learned from the location relationships between each of the two eyes and each of the optical component 102 and the optical component 104 when the user wears the head-mounted display device 200 that are shown in FIG. 4A and FIG. 4B that the electronic device 100 may obtain the IPD of the user according to Formula 1.

$$IPD=IOD-\Delta i1+\Delta i2 \quad \text{Formula 1}$$

In Formula 1, the IPD is an actual inter-pupillary distance of the user currently wearing the head-mounted display device 200.

The IOD is a distance between a center of the optical component 102 and a center of the optical component 104.

$\Delta i1$ is associated with a leftmost edge and a rightmost edge that can be seen by the left eye of the user on the display 101, that is, a value of $\Delta i1$ may be determined based on the leftmost edge and the rightmost edge that can be seen by the left eye of the user on the display 101.

$\Delta i2$ is associated with a leftmost edge and a rightmost edge that can be seen by the right eye of the user on the display 103, that is, a value of $\Delta i2$ may be determined based on the leftmost edge and the rightmost edge that can be seen by the right eye of the user on the display 103.

When obtaining the IPD of the user according to Formula 1, the electronic device 100 needs to determine values of the following three parameters: the IOD, $\Delta i1$, and $\Delta i2$. The following describes in detail how the electronic device 100 determines the values of the three parameters.

(1) The electronic device 100 determines the IOD.

The IOD is fixed after the head-mounted display device 200 is delivered from a factory. Usually, head-mounted display devices of a same model have a same IOD.

In some embodiments, the electronic device 100 may obtain a specific value of the IOD from a pre-installed installation package of an application used to manage the head-mounted display device 200.

In some other embodiments, the electronic device 100 may further obtain a specific value of the IOD of the head-mounted display device 200 from the Internet after connecting to the head-mounted display device 200 and obtaining a model of the head-mounted display device 200.

(2) The electronic device 100 determines $\Delta i1$.

Because the value of $\Delta i1$ affects the leftmost edge and the rightmost edge that can be seen by the left eye of the user on the display 101, the electronic device 100 may determine $\Delta i1$ based on the leftmost edge and the rightmost edge that can be seen by the left eye of the user on the display 101.

In subsequent embodiments, how the electronic device 100 determines $\Delta i1$ is described in detail by using the following two parts 1 and 2.

1. The electronic device 100 obtains a first location and a second location, where the first location is located on the leftmost edge that can be seen by the left eye of the user on the display 101, and the second location is located on the rightmost edge that can be seen by the left eye of the user on the display 101.

In this embodiment of this application, the electronic device 100 may display a user interface by using the head-mounted display device 200, where the user interface may be used by the user to indicate the first location and the second location. The electronic device 100 may obtain the first location and the second location according to the indication of the user.

Figure 5A:
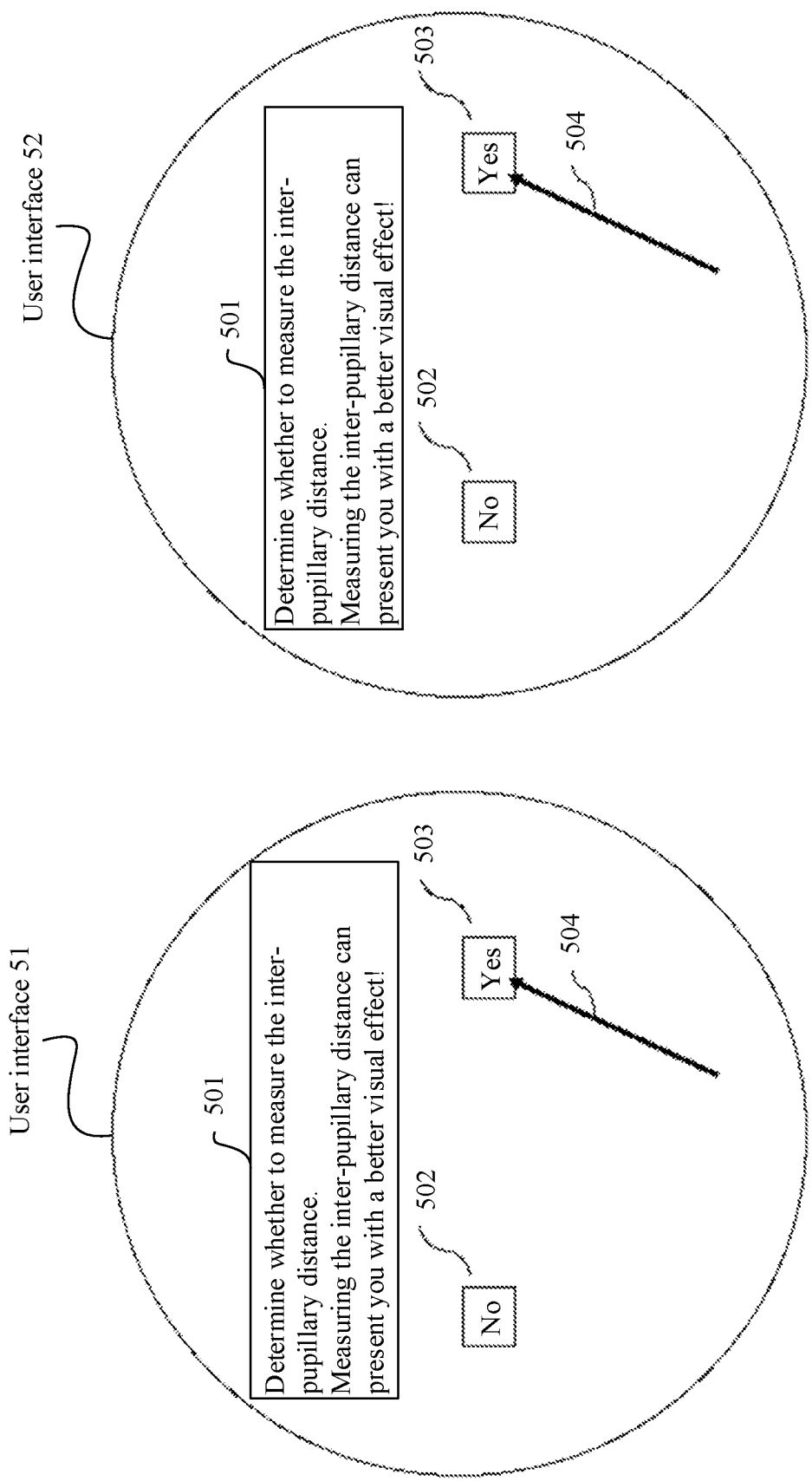
FIG. 5A to FIG. 5C each show user interfaces displayed on a head-mounted display device according to an embodiment of this application.
Figure 5B:
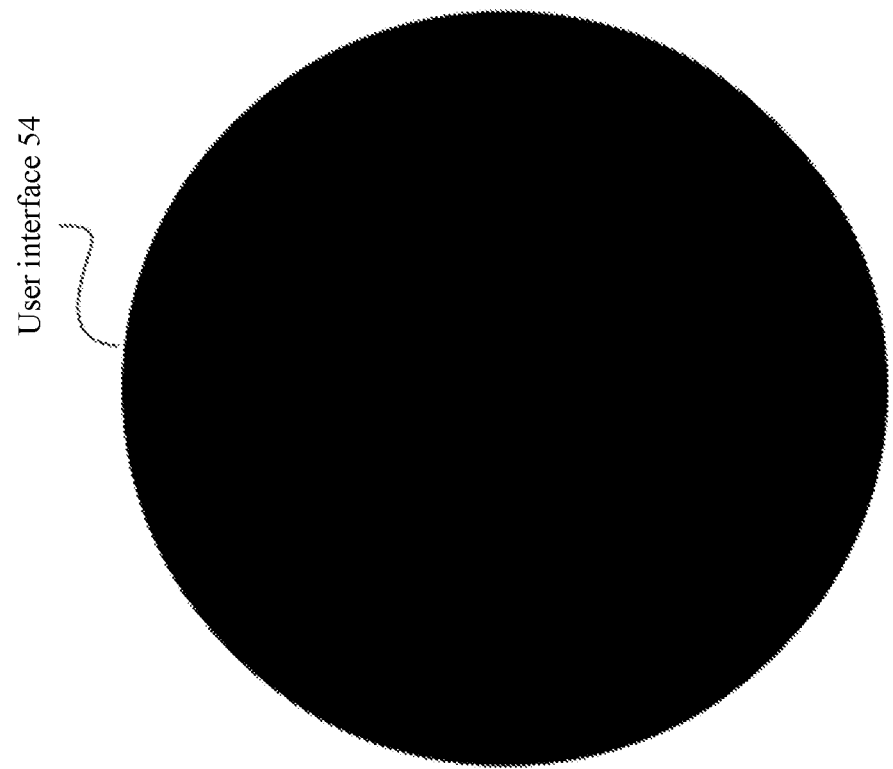
Figure 5B:
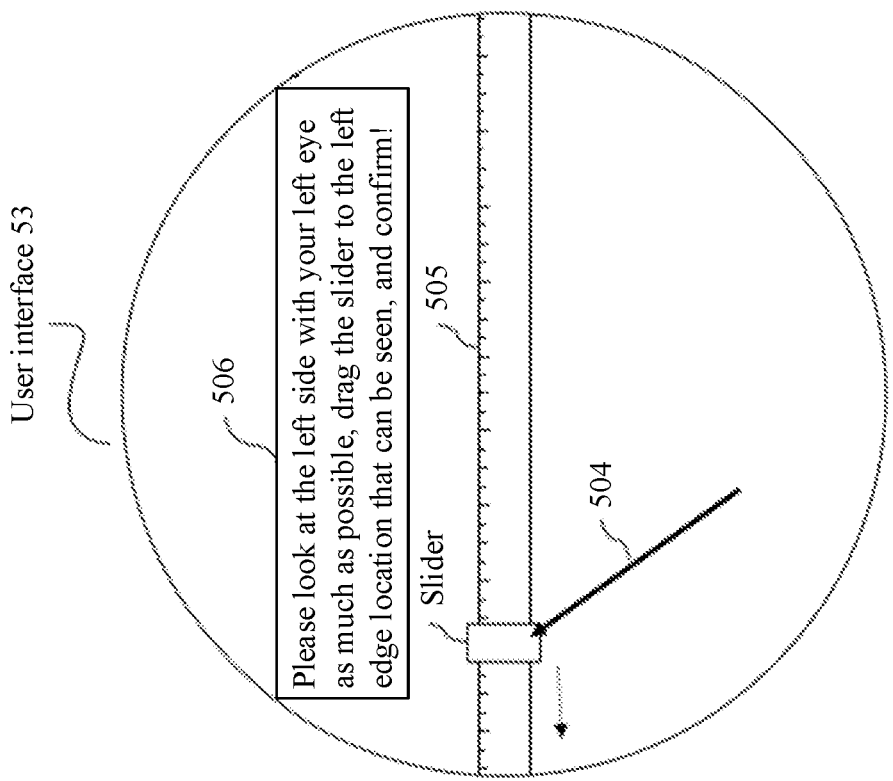
Figure 5C:
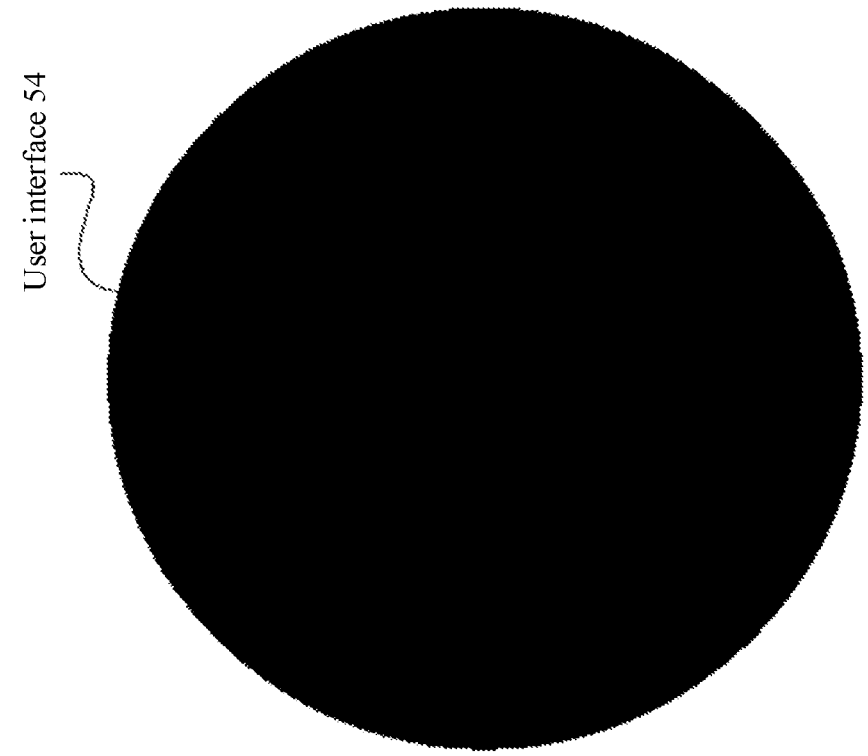
Figure 5C:
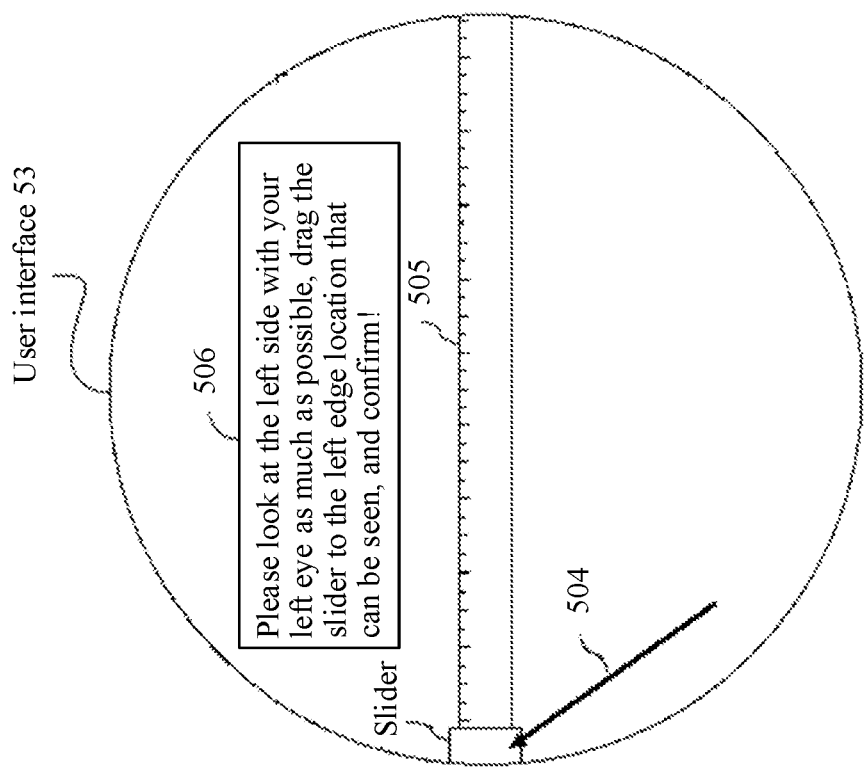

The following uses user interfaces shown in FIG. 5A to FIG. 5C as examples to describe in detail how the electronic device 100 obtains the first location and the second location.

FIG. 5A shows an example of a user interface 51 and a user interface 52 displayed on the head-mounted display device 200. The user interface 51 and the user interface 52 are generated by the electronic device 100 and transmitted to the head-mounted display device 200. For example, the user interface 51 may be displayed on the display 101, and the user interface 52 may be displayed on the display 103. In a embodiment, the electronic device 100 may construct a 3D scenario based on pre-stored 3D scenario information. The 3D scenario information describes some information about a 3D scenario that is expected to be experienced by the user, that is, the 3D scenario information indicates an object that can be seen by the user when the user is in the 3D scenario and relative locations of each object and the user. Then, the electronic device 100 may simulate or assume that the user is naturally in the constructed 3D scenario, obtain an image seen by the left eye of the user, and display the image on the display 101, to display the user interface 51 on the display 101; and obtain an image seen by the right eye of the user, and display the image on the display 103, to display the user interface 52 on the display 103.

It should be noted that, the image in the user interface 51 displayed on the display 101 and the image in the user interface 52 displayed by the display 103 have parallax, so that the user experiences the 3D scenario.

As shown in FIG. 5A, a prompt box 501, a control 502, a control 503, and a cursor 504 are displayed in each of the user interface 51 and the user interface 52.

The cursor 504 is located at a location in the user interface 51. The user may adjust the location of the cursor 504 in the user interface 51 by using the input device 300, that is, the user may move the cursor 504 by using the input device 300. For a embodiment in which the user moves the cursor 504 by using the input device 300, refer to related descriptions in the system 10 shown in FIG. 2. An implementation form of the cursor 504 may include an arrow, a circle, or another icon. The cursor 504 shown in FIG. 5A is located on the control 503.

The prompt box 501 is configured to display prompt information, where the prompt information may be used to prompt the user. For example, the prompt information may be a text "Determine whether to measure the inter-pupillary distance. Measuring the inter-pupillary distance can present you with a better visual effect!", and is used to prompt the user to measure the IPD and prompt the user with an effect obtained after the IPD is measured.

The control 502 is configured to stop enabling an IPD measurement function of the electronic device 100. The electronic device 100 does not measure the IPD of the user in response to interaction between the user and the control 502.

The control 503 is configured to enable an IPD measurement function of the electronic device 100. The electronic device 100 may start to measure the IPD of the user in response to interaction between the user and the control 503.

In this embodiment of this application, after displaying, by using the head-mounted display device 200, the user interface 51 and the user interface 52 shown in FIG. 5A, the electronic device 100 may enable the IPD measurement function of the electronic device 100 in response to user operations used to enable the IPD measurement function of the electronic device 100, where the user operations used to enable the IPD measurement function of the electronic device 100 is entered by the user based on the user interface 51 and the user interface 52.

In some embodiments, the user operation used to enable the IPD measurement function of the electronic device 100 may be a user operation that is detected by the input device 300 and that is of pressing the OK button of the input device 300 after the input device 300 moves. Based on a start point of the cursor 504 in each of the user interface 51 and the user interface 52, the motion of the input device 300 enables an end point of the cursor 504 that is obtained after the cursor 504 moves in each of the user interface 51 and the user interface 52 to be the same as a location of the control 503. In other words, when the motion of the input device 300 ends, the cursor 504 is located on the control 503. In response to the motion of the input device 300, the electronic device moves the cursor 504 to the control 503, where a movement track of moving the cursor 504 to the control 503 is determined based on a motion track generated when the input device 100 moves. In a embodiment, the input device 300 may collect specific data (for example, an acceleration collected by an acceleration sensor, and a motion speed and a motion direction that are collected by a gyro sensor), and may send the specific data to the electronic device 100. The specific data indicates that the OK button of the input device 300 is pressed after the input device 300 moves. The electronic device 100 may enable an IPD measurement function based on the specific data. In embodiments, the user may control the input device 300 to move, to trigger the electronic device 100 to move the cursor 504 to the control 503, and then press the OK button of the input device 300, to trigger the electronic device 100 to enable the IPD measurement function.

In some embodiments, the user operation used to enable the IPD measurement function of the electronic device 100 may be an operation that is detected by the head-mounted display device 200 and that is of rotating the head of the user in a specific direction. The specific direction may be a left direction, a right direction, a top direction, a bottom direction, or the like of the user. In a embodiment, a sensor in the sensor system 204 of the head-mounted display device 200 may collect specific data (for example, a motion speed and a motion direction that are collected by a gyro sensor), and send the specific data to the electronic device 100. The specific data indicates that the head of the user rotates in a specific direction. The electronic device 100 may enable an IPD measurement function based on the specific data. In embodiments, the user may rotate the head in a specific direction, to trigger the electronic device 100 to enable the IPD measurement function.

In some embodiments, the user operation used to enable the IPD measurement function of the electronic device 100 may be a voice instruction detected by the head-mounted display device 200. The voice instruction may be, for example, "start measurement". In a embodiment, a microphone of the head-mounted display device 200 may collect voice data entered by the user, and send the voice data to the electronic device 100. The voice data indicates the voice instruction. The electronic device 100 may enable an IPD measurement function based on the voice data. In embodiments, the user may speak a voice instruction, to trigger the electronic device 100 to enable the IPD measurement function.

In some embodiments, the user operation used to enable the IPD measurement function of the electronic device 100 may be a user operation that is detected by the head-mounted display device 200 and in which the left eye of the user looks at the control 503 and does not rotate within preset duration. In a embodiment, a camera of the head-mounted display device 200 may collect a specific image of an eyeball of the user, and send the specific image to the electronic device 100. The specific image indicates that the left eye of the user looks at the control 503 and does not rotate within preset duration. The electronic device 100 may enable an IPD measurement function based on the specific image. In embodiments, the user may look at the control 503 for a long time, to trigger the electronic device 100 to enable the IPD measurement function.

In addition to the example manners in the foregoing embodiments, in this embodiment of this application, the user operation used to enable the IPD measurement function of the electronic device 100 may alternatively be in another form. For example, the user operation used to enable the IPD measurement function of the electronic device 100 may alternatively be an operation that is detected by the head-mounted display device 200 and in which the left eye of the user looks at the control 503 and blinks twice. Other forms of the user operation used to enable the IPD measurement function of the electronic device 100 are not listed one by one in this embodiment of this application.

In response to the user operation used to enable the IPD measurement function of the electronic device 100, the electronic device 100 may enable the function of measuring the IPD of the user, and start to measure the IPD of the user.

FIG. 5B shows an example of a user interface 53 and a user interface 54 displayed on the head-mounted display device 200. The user interface 53 and the user interface 54 may be generated by the electronic device 100 and transmitted to the head-mounted display device 200 when the electronic device 100 enables a function of measuring an IPD of a user, that is, the user interface 53 and the user interface 54 may be generated by the electronic device 100 and transmitted to the head-mounted display device 200 in response to a user operation used to enable an IPD measurement function of the electronic device 100. For a manner in which the electronic device 100 generates the user interface 53 and the user interface 54, refer to a manner in which the electronic device 100 generates the user interface 51 and the user interface 52. Details are not described herein again.

As shown in FIG. 5B, the user interface 53 is displayed on the display 101, and the user interface 54 is displayed on the display 103. When the display 103 displays the user interface 54, a black screen may be displayed (that is, the head-mounted display device 200 stops supplying power to the display 103), or a black image may be displayed. This can help the user focus on the left eye.

A cursor 504, an image 505, and a prompt box 506 are displayed in the user interface 53.

The cursor 504 is located at a location in the user interface 53. For the cursor 504, refer to the cursor 504 in each of the user interface 51 and the user interface 52 shown in FIG. 5A. Details are not described herein again.

The prompt box 506 is configured to display prompt information, where the prompt information may be used to prompt the user. For example, the prompt information may be a text "Please look at the left side with your left eye as much as possible, drag the slider to the left edge location that can be seen, and confirm", and is used to prompt the user to indicate a first location. In this embodiment of this application, first prompt information may be the prompt information. In addition to the prompt information displayed in the user interface 53, the first prompt information may alternatively be a voice output by the electronic device 100, prompt information of another type, or the like. This is not limited in this embodiment of this application.

Content of the image 505 is not limited in this embodiment of this application. The image 505 may be, for example, an image of a ruler with a slider. The ruler with the slider is parallel to the third straight line and passes through a midpoint of the display 101, that is, the ruler with the slider is located on the fourth straight line. Descriptions are provided in the following embodiments by using an example in which the image 505 is an image of a ruler with a slider.

In this embodiment of this application, after displaying the user interfaces shown in FIG. 5B, the electronic device 100 may obtain the first location in response to a user operation used to indicate the first location. The user operation used to indicate the first location is entered by the user based on the user interface 53 displayed on the display 101.

In some embodiments, the user operation used to indicate the first location may be an operation that is detected by the input device 300 and in which after the input device 300 moves along a first track, the OK button of the input device 300 is pressed and the input device 300 moves along a second track, and then the OK button of the input device 300 is stopped being pressed. Based on a start point of the cursor 504 in the user interface 53, the motion of the input device 300 along the first track enables an end point of the cursor 504 that is obtained after the cursor 504 moves in the user interface 53 to be the same as a location of an image of the slider. In embodiments, after the input device 300 moves along the second track, the end point of the cursor 504 that is obtained after the cursor 504 moves in the user interface 53 is a location at which movement of the image of the slider ends.

In an embodiment, the input device 300 may collect specific data (for example, an acceleration collected by an acceleration sensor, and a motion speed and a motion direction that are collected by a gyro sensor), and may send the specific data to the electronic device 100. The specific data indicates that after the input device 300 moves along the first track, the OK button of the input device 300 is pressed and the input device 300 moves along the second track, and then the OK button is stopped being pressed.

In response to the user operation used to indicate the first location, the electronic device 100 moves the cursor 504 to the image of the slider, then moves the cursor 504 and the image of the slider, and determines, as the first location, a location at which movement of the image of the slider ends. In embodiments, the user may control the input device 300 to move along the first track, to trigger the electronic device 100 to move the cursor 504 to the image of the slider, press the OK button of the input device 300 and simultaneously control the input device 300 to move along the second track, and then stop pressing the OK button, to indicate the first location.

In some embodiments, the user operation used to indicate the first location may be a user operation that is detected by the head-mounted display device 200 and in which the left eye of the user does not rotate within preset duration. In a embodiment, a camera of the head-mounted display device 200 may collect a specific image of an eyeball of the user, and send the specific image to the electronic device 100. The specific image indicates that the left eye of the user does not rotate within preset duration. The electronic device 100 may determine, as the first location based on the specific image, a location at which the left eye of the user looks at the display 101 when the left eye of the user does not rotate within preset duration. In embodiments, the user may look at a location in the display 101 for a long time, to indicate the location as the first location.

In some embodiments, after collecting the specific image, the head-mounted display device 200 may also determine, as the first location, a location that is determined based on the specific image and at which the left eye of the user looks at the display 101 when the left eye of the user does not rotate within preset duration. Then, the head-mounted display device 200 may send the determined first location to the electronic device 100, so that the electronic device 100 obtains the first location.

In this embodiment of this application, the image that is of the eyeball of the user and that is collected by the head-mounted display device 200 is obtained by collecting operation data of the user.

In addition to the example forms in the foregoing embodiments, in this embodiment of this application, the user operation used to indicate the first location may be alternatively in another form. Other forms of the user operation used to indicate the first location are not listed one by one in this embodiment of this application.

The electronic device 100 may further obtain the second location in a manner the same as that shown in the foregoing embodiments in FIG. 5B and FIG. 5C. For example, after obtaining the first location, the electronic device 100 may change the prompt information in the prompt box in the user interface 53 displayed on the head-mounted display device 200 to a text "Please look at the right side with your left eye as much as possible, drag the slider to the right edge location that can be seen, and confirm". Then, the head-mounted display device 200 or the input device 300 may detect a user operation used to indicate the second location, and send, to the electronic device 100, detected specific data or a detected specific image indicating the user operation used to indicate the second location. The electronic device 100 may obtain the second location based on the specific data or the specific image. The user operation used to indicate the second location is entered by the user based on the user interface 53 displayed on the display 101. The user operation used to indicate the second location is similar to the user operation used to indicate the first location. For details, refer to the user operation used to indicate the first location. The details are not described herein again.

In this embodiment of this application, second prompt information may be prompt information that is displayed in the user interface 53 and that is used to prompt the user to indicate the second location, for example, may be the foregoing text "Please look at the right side with your left eye as much as possible, drag the slider to the right edge location that can be seen, and confirm". In addition to the foregoing prompt information, the second prompt information may alternatively be a voice output by the electronic device 100, prompt information of another type, or the like. This is not limited in this embodiment of this application.

In this embodiment of this application, the first user interface may be a user interface that is displayed on the display 101 and that is used by the user to indicate the first location and the second location. For example, the first user interface may be the user interface 53 shown in FIG. 5B. It should be noted that the user interface 53 is merely an example, and the first user interface may alternatively be implemented in another form. This is not limited in this embodiment of this application.

A time sequence in which the electronic device 100 obtains the first location and the second location is not limited in this embodiment of this application. In some embodiments, the electronic device 100 may first obtain the first location based on a detected user operation used to indicate the first location, and then obtain the second location based on a detected user operation used to indicate the second location. In some other embodiments, the electronic device 100 may first obtain the second location based on a detected user operation used to indicate the second location, and then obtain the first location based on a detected user operation used to indicate the first location.

In some embodiments, the electronic device 100 may output the user interface 51 and the user interface 52 when the head-mounted display device 200 is powered on for the first time. In this way, the electronic device 100 may obtain the first location and the second location when the head-mounted display device 200 is powered on for the first time, to obtain an IPD of the user, and display images on the head-mounted display device 200 based on the IPD of the user. In this way, after the head-mounted display device 200 is powered on for the first time, it can be ensured that the user can comfortably, easily, and naturally perform convergence when wearing the head-mounted display device 200, and a 3D scenario actually experienced by the user is consistent with a scenario constructed by the electronic device 100.

In some embodiments, the electronic device 100 may periodically output the user interface 51 and the user interface 52. For example, the electronic device 100 may display the user interface 51 and the user interface 52 on the head-mounted display device 200 once a month or once a week, to periodically obtain an IPD of the user, and display images on the head-mounted display device 200 based on the IPD of the user. In this way, even if the IPD of the user changes, it can be ensured that the user can comfortably, easily, and naturally perform convergence when wearing the head-mounted display device 200, and a 3D scenario actually experienced by the user is consistent with a scenario constructed by the electronic device 100.

In some embodiments, the electronic device 100 may output the user interface 51 and the user interface 52 based on a user requirement. For example, after the user does not use the head-mounted display device 200 for a long time, the user may actively trigger, in a setting interface displayed on the head-mounted display device 200, the electronic device 100 to output the user interface 51 and the user interface 52.

In some embodiments, the electronic device 100 may output the user interface 51 and the user interface 52 when a new user wears the head-mounted display device 200. In embodiments, when a user wears the head-mounted display device 200, the electronic device 100 may identify whether the current user is a new user. The electronic device 100 may identify a user by using a biometric feature such as an iris, a fingerprint, a voiceprint, or a face, where the biometric feature may be collected by the head-mounted display device 200 or the electronic device 100. In this way, the electronic device 100 may determine an IPD of each user, and display the images on the head-mounted display device 200 based on IPDs of different users. This ensures that each user can comfortably, easily, and naturally perform convergence when wearing the head-mounted display device 200, and a 3D scenario actually experienced by the user is consistent with a scenario constructed by the electronic device 100, to bring good visual experience to each user.

In addition to a manner of outputting the special first user interface shown in FIG. 5A to FIG. 5C, in some other embodiments, the electronic device 100 may further obtain the first location and the second location in another manner. For example, the head-mounted display device 200 may collect, by using a camera, an eyeball image of a user within a period of time (for example, within one week or one month) when the user uses the head-mounted display device 200, and send the image to the electronic device 100. The electronic device 100 determines, based on the image, a leftmost edge and a rightmost edge that are on the display 101 and that can be seen by the left eye of the user within the period of time, to obtain the first location and the second location. In this way, the electronic device 100 can determine $\Delta i1$ without a special operation or feedback of the user, to obtain the IPD of the user, and display the images on the head-mounted display device 200 based on the IPD of the user. This manner is simpler and more convenient for the user, and provides better experience.

2. The electronic device 100 determines $\Delta i1$ based on the first location and the second location.

The electronic device 100 may calculate $\Delta i1$ based on a geometric relationship obtained when the user wears the head-mounted display device 200. The following describes the geometric relationship in detail, and derives a calculation formula of $\Delta i1$.

Figure 6:
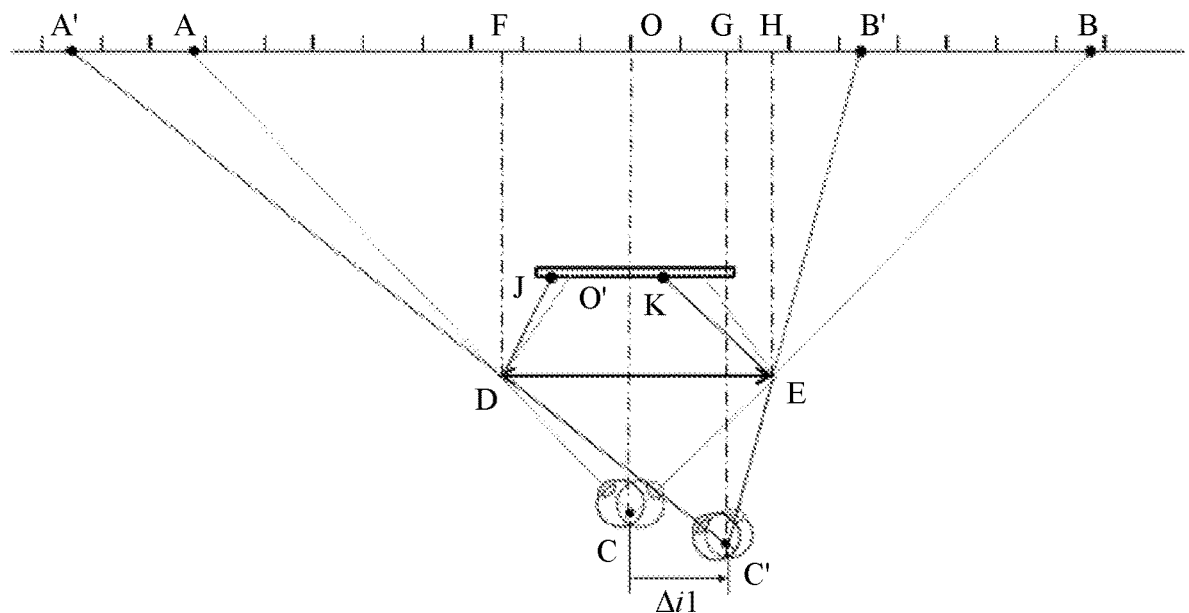
FIG. 6 is a schematic diagram of a geometric relationship used for calculating an IPD of a user according to an embodiment of this application.

FIG. 6 is a schematic diagram of a geometric relationship that can be obtained by the electronic device 100 and that is obtained when a user wears the head-mounted display device 200 according to an embodiment of this application.

C' is a location of the left eye when the user wears the head-mounted display device 200.

O' is a center of the display 101.

J is the first location, and K is the second location. For a manner of determining J and K, refer to related descriptions in the point (1).

D is an intersection point of a left edge of the optical component 102 and the third straight line, and E is an intersection point of a right edge of the optical component 102 and the third straight line.

O is a center of a virtual image plane, is also an imaging point corresponding to O' on the virtual image plane, and is an intersection point of the first straight line and the virtual image plane. A' and B' are respectively imaging points corresponding to J and K on the virtual image plane.

Because A' is a virtual image point of the first location, A', D, and C' are located on a same straight line. Because B' is a virtual image point of the second location, B', E, and C' are located on a same straight line.

C is a point on the first straight line. Assuming that the left eye of the user is at the point C, A and B are respectively imaging points of the first location and the second location corresponding to the assumed left eye of the user on the virtual image plane. A, D, and C are located on a same straight line, and B, E, and C are located on a same straight line.

F is a foot of a perpendicular obtained after a vertical line including D is drawn for the virtual image plane. H is a foot of a perpendicular obtained after a vertical line including E is drawn for the virtual image plane. G is a foot of a perpendicular obtained after a vertical line including C' is drawn for the virtual image plane.

An offset of C' relative to the first straight line is $\Delta i1$.

Assuming that the first location is on the fourth straight line (that is, the point J is on the fourth straight line), A', D, F, C', and G are on a same plane. Assuming that the second location is on the fourth straight line (that is, the point K is on the fourth straight line), B', E, H, C', and G are on a same plane. In this case, it can be learned from the geometric relationship shown in FIG. 6 that there are the following two pairs of similar triangles:

$$\triangle A'DF \sim \triangle A'C'G$$

$$\triangle AB'EH \sim \triangle B'C'G$$

Therefore, the following proportional relationship may be obtained:

$$\frac{A'F}{DF} = \frac{A'G}{C'G}$$
$$\frac{B'H}{EH} = \frac{B'G}{C'G}$$

DF=EH because the third straight line on which D and E are located is parallel to the virtual image plane. Therefore, the following relationship can be obtained:

$$\frac{A'F}{B'H} = \frac{A'G}{B'G}$$

It can be learned from FIG. 6 that A'F=A'O–L/2, A'G=A'O+$\Delta i1$, B'H=B'O–L/2, and B'G=B'O–$\Delta i1$. Herein, L is a diameter of the optical component 102. Therefore, the following relationship can be obtained:

$$\frac{A'O - L/2}{B'O - L/2} = \frac{A'O + \Delta i1}{B'O - \Delta i1}$$

It can be learned according to an imaging principle that A'=M×JO', and B'O=M×KO'. M is a magnification of the optical component 102 for image light. Therefore, Formula 2 may be derived, and the electronic device 100 may calculate $\Delta i1$ according to Formula 2:

$$\Delta i1 = \frac{M(JO' - KO')L}{2(M \times (JO' + KO') - L)} \qquad \text{Formula 2}$$

$\Delta i1$ calculated according to Formula 2 is a value with a sign. When a value of $\Delta i1$ is positive, it indicates that the left eye of the user offsets rightward relative to the first straight line; or when a value of $\Delta i1$ is negative, it indicates that the left eye of the user offsets leftward relative to the first straight line. An offset distance of the left eye of the user relative to the first straight line is an absolute value of $\Delta i1$.

In some embodiments of this application, when the first location is not on the fourth straight line, or the second location is not on the fourth straight line, the geometric relationship shown in FIG. 6 is actually not established. In this case, it may be assumed that the geometric relationship shown in FIG. 6 is established, and $\Delta i1$ is calculated according to Formula 2. $\Delta i1$ calculated in this case slightly differs from an offset that is of the left eye of the user relative to the first straight line and that is represented by $\Delta i1$, but may enable the user to indicate the first location and the second location in richer forms. For example, when the electronic device 100 displays the user interface 53 through the display 101 of the head-mounted display device 200, a ruler in the user interface 53 may be parallel to the third straight line and deviate from a midpoint of the display 101, so that the user can indicate the first location and the second location based on the user interface 53.

When calculating $\Delta i1$ according to Formula 2, the electronic device 100 needs to determine values of the following parameters: M, L, JO', and KO'. The following describes in detail how the electronic device 100 determines the values of the parameters.

M is a magnification of the optical component 102. Values of M of some head-mounted display devices are fixed, and each are a ratio of a virtual image height to a real image height. In this case, the electronic device 100 may obtain a value of M from a pre-installed installation package of an application used to manage the head-mounted display device 200, or may obtain a value of M from the Internet based on a model of the head-mounted display device 200 after obtaining the model. Values of M of some head-mounted display devices are adjustable. In this case, the electronic device 100 may first obtain focus adjustment information (for example, a current resistance value of a sliding rheostat) of the head-mounted display device, and calculate a current value of M of the head-mounted display device 200 based on the focus adjustment information.

L is a diameter of the optical component 102. L is fixed after the head-mounted display device is delivered from a factory. In addition, usually, head-mounted display devices of a same model have same L. In some embodiments, the electronic device 100 may obtain a value of L from a pre-installed installation package of an application used to manage the head-mounted display device 200. In some other embodiments, the electronic device 100 may further obtain a value of L of the head-mounted display device 200 from the Internet based on a model of the head-mounted display device 200 after connecting to the head-mounted display device 200 and obtaining the model.

JO' is a distance from the first location to the center of the display 101 when the user wears the head-mounted display device 200. The electronic device 100 may calculate the value based on the first location. For a manner of determining the first location, refer to related descriptions in the point 1. In a specific embodiment, the electronic device 100 may calculate a quantity of pixels between the first location and the center of the display 101, and then obtain a value of JO' by multiplying the quantity of pixels by a size of each pixel.

KO' is a distance from the second location to the center of the display 101 when the user wears the head-mounted display device 200. The electronic device 100 may calculate the value based on the determined second location. For a manner of determining the second location, refer to related descriptions in the point 1. In a specific embodiment, the electronic device 100 may calculate a quantity of pixels between the second location and the center of the display 101, and then obtain a value of KO' by multiplying the quantity of pixels by a size of each pixel.

(3) The electronic device 100 determines $\Delta i2$.

Because the value of $\Delta i2$ affects the leftmost edge and the rightmost edge that can be seen by the right eye of the user on the display 103, the electronic device 100 may determine $\Delta i2$ based on the leftmost edge and the rightmost edge that can be seen by the right eye of the user on the display 103.

In embodiments, the electronic device 100 may obtain the third location and the fourth location, where the third location is located on the leftmost edge that can be seen by the right eye of the user on the display 103, and the fourth location is located on the rightmost edge that can be seen by the right eye of the user on the display 103.

A manner in which the electronic device 100 obtains the third location and the fourth location is similar to the manner in which the electronic device 100 obtains the first location and the second location in the point (1). For details, refer to the foregoing related descriptions. The details are not described herein again.

For example, the electronic device 100 may display, on the head-mounted display device 200, a user interface used by the user to indicate the third location and the fourth location. In embodiments, the electronic device 100 may display, on the display 101 of the head-mounted display device 200, the user interface 54 shown in FIG. 5B, and display, on the display 103, the user interface 53 shown in FIG. 5B. Then, the electronic device 100 may detect a user operation used to indicate the third location, and obtain the third location in response to the user operation used to indicate the third location; and may further detect a user operation used to indicate the fourth location, and obtain the fourth location in response to the user operation used to indicate the fourth location. The user operation used to indicate the third location and the user operation used to indicate the fourth location are entered by the user based on the user interface 53 displayed on the display 103. For the user operation used to indicate the third location and the user operation used to indicate the fourth location, refer to the user operation used to indicate the first location and the user operation used to indicate the second location.

In some embodiments, the user interface displayed by the electronic device 100 on the display 101 may not be the user interface 53. This is not limited in this embodiment of this application. In this embodiment of this application, a second user interface may be the user interface that is displayed by the electronic device 100 on the display 103 and that is used by the user to indicate the third location and the fourth location.

It should be noted that a time sequence in which the electronic device 100 displays the first user interface on the display 101 and displays the second user interface on the display 103 is not limited in this embodiment of this application. The operations may be performed in sequence, or may be performed simultaneously.

It should be noted that a time sequence in which the electronic device 100 determines the first location, the second location, the third location, and the fourth location is not limited in this embodiment of this application. The operations may be performed in sequence, or may be performed simultaneously.

A manner in which the electronic device 100 determines $\Delta i2$ based on the third location and the fourth location is similar to the manner in which the electronic device 100 determines $\Delta i1$ based on the first location and the second location in the point (1). For details, refer to the foregoing related descriptions. The details are not described herein again. For example, the electronic device 100 may calculate $\Delta i2$ based on a geometric relationship similar to that in FIG. 6.

Therefore, based on the descriptions in the points (1), (2), and (3), the electronic device 100 may determine specific values of the three parameters in Formula 1, and may obtain the IPD of the user according to Formula 1.

In some optional embodiments, the left eye and the right eye of the user are symmetric, that is, a perpendicular bisector of a connection line in which the left eye and the right eye of the user are located is also a perpendicular bisector of a connection line in which the center of the optical component 102 and the center of the optical component 104 are located. In this case, $\Delta i1$ and $\Delta i2$ have a same value but opposite signs, and the electronic device 100 may calculate the IPD of the user by using Formula 3 or Formula 4:

$$IPD = IOD - 2 \times \Delta i1 \qquad \text{Formula 3}$$

$$IPD = IOD + 2 \times \Delta i2 \qquad \text{Formula 4}$$

In this way, after determining $\Delta i1$ or $\Delta i2$, the electronic device 100 may obtain the IPD of the user, to reduce a calculation process of the electronic device 100. In addition, user operations can also be reduced, which is simpler and more convenient for the user, and can improve user experience.

(II) The electronic device 100 stores the IPD of the user.

The electronic device 100 may store one or more IPDs of one or more users. In this way, when different users wear the head-mounted display device 200, the electronic device 100 may determine, based on an IPD of a user, images to be displayed on the head-mounted display device 200, and display the images on the head-mounted display device 200. In this way, a natural and comfortable convergence process is enabled when the user watches an object in a 3D scenario, and a 3D scenario actually experienced by the user after convergence is consistent with the 3D scenario constructed by the electronic device 100.

The electronic device 100 may locally store the IPD of the user, or may store the IPD of the user in a cloud. This is not limited in this embodiment of this application.

In an embodiment, the electronic device 100 may associate the obtained IPD of the user with a user identifier and store the obtained IPD of the user and the user identifier. In some other embodiments, in addition to the IPD of the user, the electronic device 100 may further associate one or more of $\Delta i1$ and $\Delta i2$ with the user identifier and store the one or more of $\Delta i1$ and $\Delta i2$ and the user identifier. The user identifier may include a name, a nickname, fingerprint information, voiceprint information, face information, and the like of the user.

Table 1 shows a possible manner in which the electronic device 100 associates a plurality of user identifiers with corresponding IPDs, $\Delta i1$, and $\Delta i2$ and stores the plurality of user identifiers, the corresponding IPDs, $\Delta i1$, and $\Delta i2$. Herein, a distance between the center of the optical component 102 of the head-mounted display device 200 and the center of the optical component 104 may be 63 mm.

TABLE 1

Association and storage table of a user identifier, an IPD, $\Delta i1$, and $\Delta i2$

| User identifier | IPD | $\Delta i1$ | $\Delta i2$ |
|---|---|---|---|
| User identifier 1 | IPD = 60.97 mm | $\Delta i1$ = 1 mm | $\Delta i2$ = −1.03 mm |
| User identifier 2 | IPD = 63 mm | $\Delta i1$ = 0 mm | $\Delta i2$ = 0 mm |
| User identifier 3 | IPD = 65.02 mm | $\Delta i1$ = −1.02 mm | $\Delta i2$ = 1 mm |

(III) The electronic device 100 corrects a source image based on the IPD of the user to obtain target images, and sends the target images to the head-mounted display device 200; and the head-mounted display device 200 displays the target images on displays.

The following describes the process in detail by using the following points (1) and (2).

(1) The electronic device 100 corrects the source image based on the IPD of the user to obtain target images.

In this embodiment of this application, the target images are images that are sent by the electronic device 100 to the head-mounted display device 200 and that are displayed by the head-mounted display device 200 on the displays. The target images include a first target image and a second target image. The first target image is displayed on the display 101, and the second target image is displayed on the display 103. In some embodiments, a size of the first target image is equal to a size of the display 101, and a size of the second target image is equal to a size of the display 103.

In embodiments, the electronic device 100 first obtains the source image, and corrects the source image based on the IPD of the user, to obtain the target images. Usually, the source image may be preset in an installation package of an application installed on the electronic device 100.

How the electronic device 100 corrects the source image based on the IPD to obtain the target images in some scenarios such as a game scenario is first described. In some embodiments, the source image includes a plurality of sets of data; and one set of data corresponds to one IPD and is used to construct a 3D scenario for a user having the one IPD. The 3D scenario is a 3D scenario that is expected to be presented by the electronic device 100 to the user. In other words, the source image may indicate an object that can be seen by the user when the user is in the 3D scenario and relative locations of each object and the user.

The electronic device 100 may first generate a first image and a second image based on the IPD of the user by using the source image, where the first image and the second image are used to present the 3D scenario to the user having the IPD. One set of data corresponding to the IPD of the user in the source image is included in the plurality of sets of data. In other words, the electronic device 100 simulates, based on the source image, that the user is naturally in the 3D scenario, obtains, based on the IPD of the user, an image seen by the left eye of the user and an image seen by the right eye of the user, uses the image seen by the left eye of the user as the first image, and uses the image seen by the right eye of the user as the second image. In some embodiments, the electronic device 100 may obtain, by using two virtual cameras, an image seen by the left eye of the user and an image seen by the right eye of the user when the user is naturally in the 3D scenario. For a principle in which the electronic device 100 obtains, by using the virtual cameras, the image seen by the left eye of the user and the image seen by the right eye of the user, refer to related descriptions in the foregoing embodiments. Details are not described herein again.

Figure 7A:
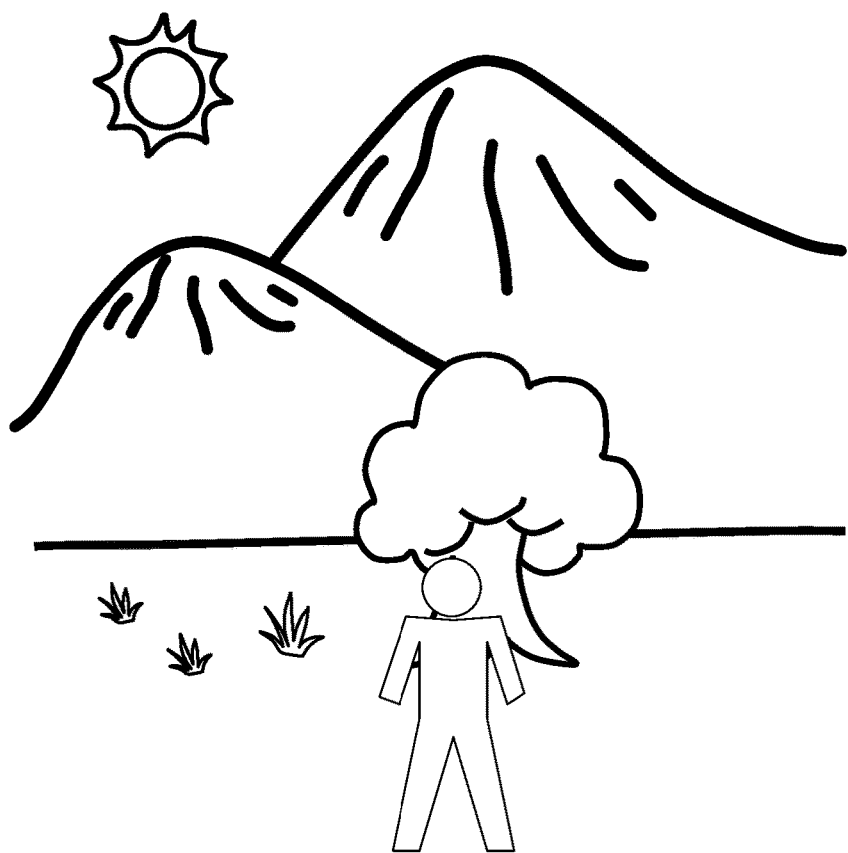
FIG. 7A is a schematic diagram of a 3D scenario constructed by an electronic device and a scenario in which it is simulated that a user is in the 3D scenario according to an embodiment of this application.

For example, FIG. 7A shows an example of a 3D scenario that is expected to be presented by the electronic device 100 to the user and a scenario in which it is simulated that the user is in the 3D scenario. As shown in FIG. 7A, the 3D scenario includes sun, mountains, trees, and grass.

Figure 7B:
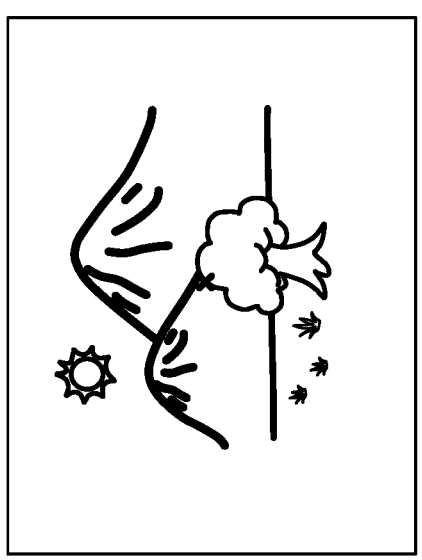
FIG. 7B shows a first image, a second image, a first target image, and a second target image that are determined based on a first IPD after an electronic device constructs the 3D scenario shown in FIG. 7A according to an embodiment of this application.
Figure 7B:
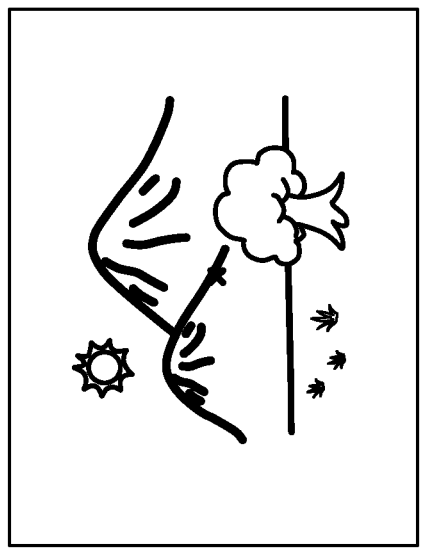
Figure 7B:
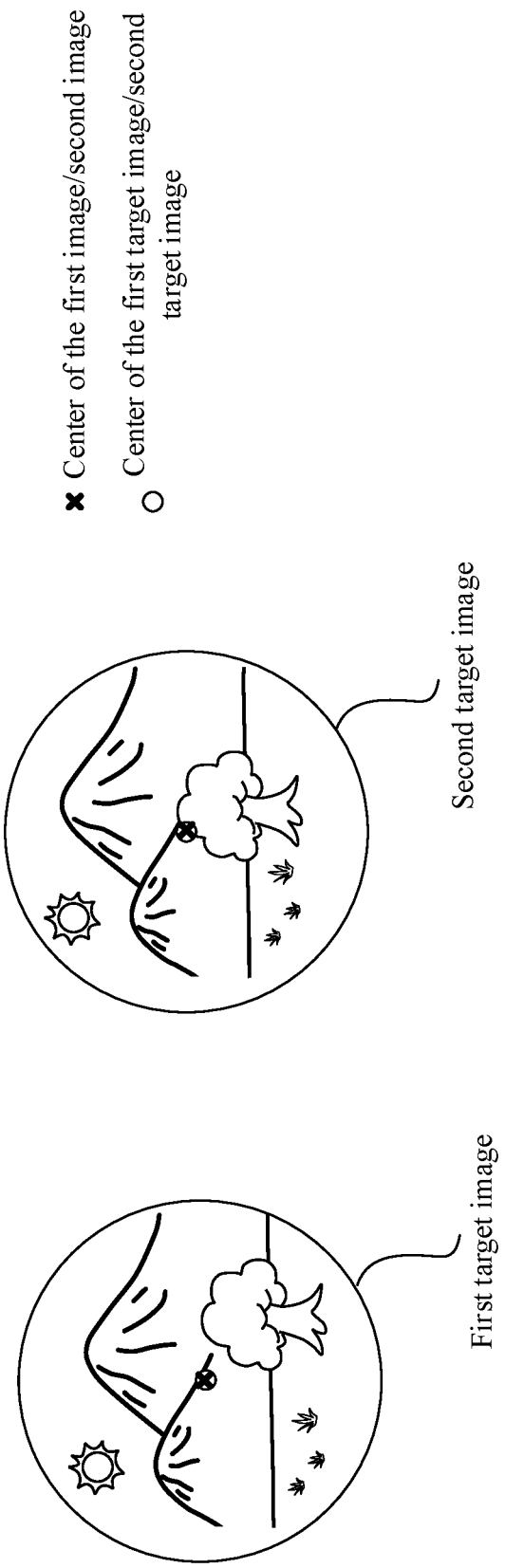

FIG. 7B shows an example of a first image and a second image that are generated by the electronic device 100 based on a first IPD by using the source image. The first IPD is equal to the IOD.

Figure 7C:
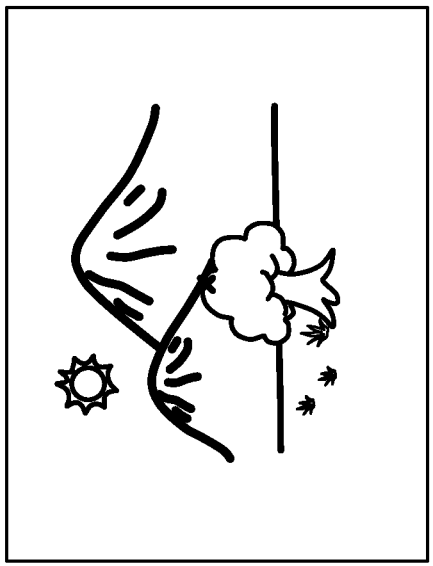
FIG. 7C shows a first image, a second image, a first target image, and a second target image that are determined based on a second IPD after an electronic device constructs the 3D scenario shown in FIG. 7A according to an embodiment of this application.
Figure 7C:
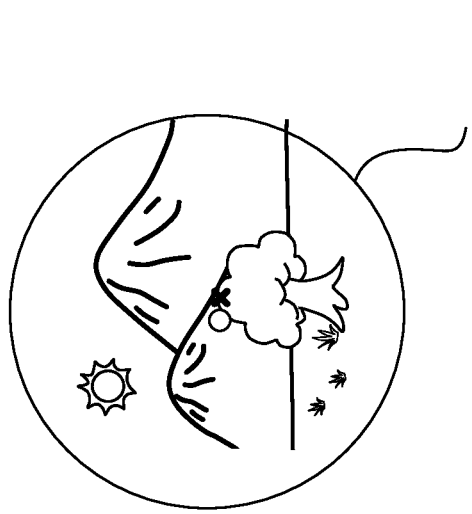
Figure 7C:
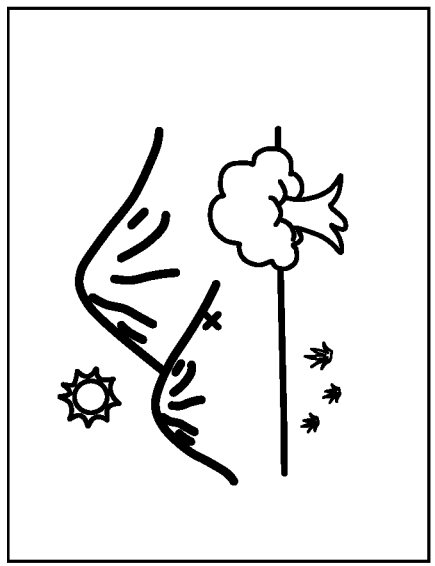
Figure 7C:
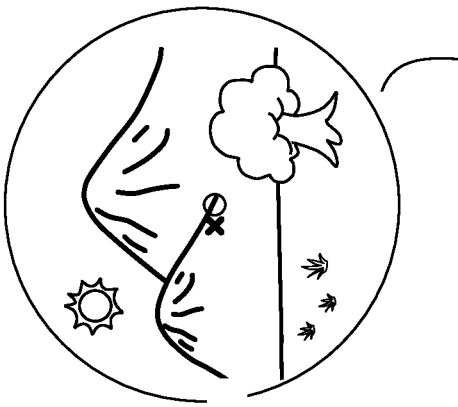

FIG. 7C shows an example of a first image and a second image that are generated by the electronic device 100 based on a second IPD by using the source image. The second IPD is not equal to the IOD.

Because the first IPD is different from the second IPD, the first image in FIG. 7B and the first image in FIG. 7C have parallax, and the second image in FIG. 7B and the second image in FIG. 7C have parallax.

Then, the electronic device 100 generates a first target image based on the first image, where the first target image is a part of the first image, the first target image includes a center of the first image, and an offset that is of the center of the first image in the first target image and that is relative to a center of the first target image is $\Delta i1$. The electronic device 100 generates a second target image based on the second image, where the second target image is a part of the second image, the second target image includes a center of the second image, and an offset that is of the center of the second image in the second target image and that is relative to a center of the second target image is $\Delta i2$. In other words, the center of the first target image is obtained by adjusting the center of the first image by the offset $\Delta i1$, and the center of the second target image is obtained by adjusting the center of the second image by the offset $\Delta i2$.

In embodiments, when $\Delta i1$ is a positive value, the center that is of the first image and that is in the first target image offsets rightward relative to the center of the first target image; or when $\Delta i1$ is a negative value, the center that is of the first image and that is in the first target image offsets leftward relative to the center of the first target image; and an offset distance is an absolute value of $\Delta i1$. Similarly, when $\Delta i2$ is a positive value, the center that is of the second image and that is in the second target image offsets rightward relative to the center of the second target image; or when $\Delta i2$ is a negative value, the center that is of the second image and that is in the second target image offsets leftward relative to the center of the second target image; and an offset distance is an absolute value of $\Delta i2$.

For example, FIG. 7B further shows an example of a first target image generated by the electronic device 100 based on the first image shown in FIG. 7B and a second target image generated by the electronic device 100 based on the second image shown in FIG. 7B. As shown in FIG. 7B, both Δi1 and Δi2 are 0.

For example, FIG. 7C shows an example of a first target image generated by the electronic device based on a first image shown in FIG. 7C and a second target image generated by the electronic device based on a second image shown in FIG. 7C. As shown in the figure, neither Δi1 nor Δi2 is 0.

How the electronic device 100 determines the target images based on the IPD in some scenarios such as a 3D movie scenario is further described. In some embodiments, the source image includes a third image and a fourth image, and the third image and the fourth image are used to present a 3D scenario to the user. Herein, the third image and the fourth image may be two images that are captured by two cameras in advance and that have parallax for a same object.

In embodiments, the electronic device 100 generates a first target image based on the third image, where the first target image is a part of the third image, the first target image includes a center of the third image, and an offset that is of the center of the third image in the first target image and that is relative to the center of the first target image is Δi1. The electronic device 100 generates a second target image based on the fourth image, where the second target image is a part of the fourth image, the second target image includes a center of the fourth image, and an offset that is of the center of the fourth image in the second target image and that is relative to the center of the second target image is Δi2. In other words, the center of the first target image is obtained by adjusting the center of the third image by the offset Δi1, and the center of the second target image is obtained by adjusting the center of the fourth image by the offset Δi2.

Herein, for a manner in which the electronic device 100 generates the first target image based on the third image, refer to FIG. 7B and a manner in which the electronic device 100 generates the first target image based on the first image. For a manner in which the electronic device 100 generates the second target image based on the fourth image, refer to FIG. 7C and a manner in which the electronic device 100 generates the second target image based on the second image. Details are not described herein again.

(2) The electronic device 100 sends the target images to the head-mounted display device 200, and the head-mounted display device 200 displays the target images on the displays.

In embodiments, the electronic device 100 sends the first target image and the second target image to the head-mounted display device 200, so that the head-mounted display device 200 displays the first target image on the display 101, and displays the second target image on the display 103.

Figure 8A:
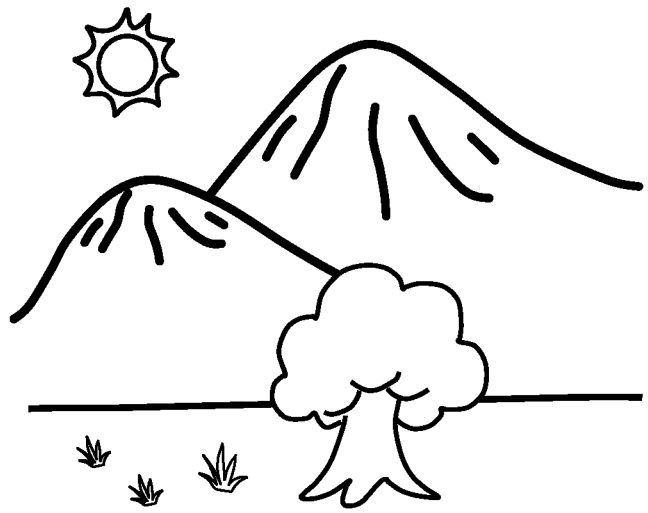
FIG. 8A shows an image fused by a user after a head-mounted display device displays the first target image and the second target image that are shown in FIG. 7B according to an embodiment of this application.

FIG. 8A shows an image fused in the brain by a user whose actual IPD is equal to a first IPD when the user wears the head-mounted display device 200 after the head-mounted display device 200 displays the first target image and the second target image that are shown in FIG. 7B, that is, a 3D scenario actually experienced by the user. In this case, the 3D scenario actually experienced by the user whose actual IPD is equal to the first IPD is consistent with the 3D scenario that is expected to be presented by the electronic device 100 to the user in FIG. 7A.

Figure 8B:
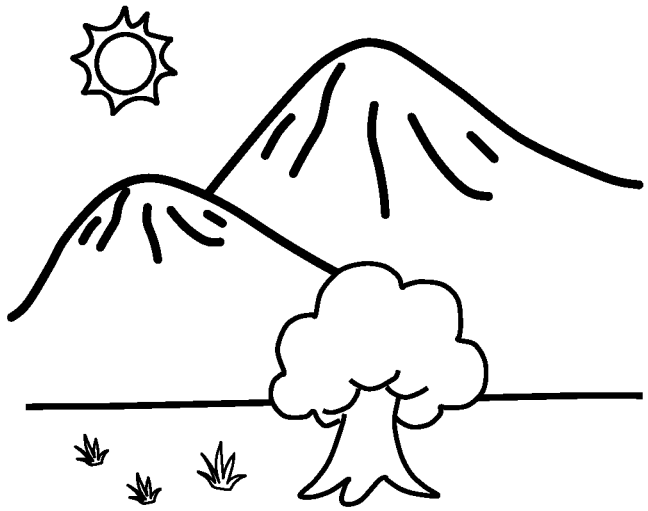
FIG. 8B is an image fused by a user after a head-mounted display device displays the first target image and the second target image that are shown in FIG. 7C according to an embodiment of this application.

FIG. 8B shows an image fused in the brain by a user whose actual IPD is equal to a second IPD when the user wears the head-mounted display device 200 after the head-mounted display device 200 displays the first target image and the second target image that are shown in FIG. 7C, that is, a 3D scenario actually experienced by the user. In this case, the 3D scenario actually experienced by the user whose actual IPD is equal to the second IPD is consistent with the 3D scenario that is expected to be presented by the electronic device 100 to the user in FIG. 7A.

It can be learned from FIG. 8A and FIG. 8B that, regardless of an actual IPD of the user, according to the display method provided in embodiments of this application, when wearing the head-mounted display device 200, the user seems to be truly in the 3D scenario that is expected to be presented by the electronic device 100 to the user. In this way, a natural and comfortable convergence process can be enabled when the user watches an object in the 3D scenario, and the 3D scenario actually experienced by the user after convergence is consistent with the 3D scenario that is expected to be presented by the electronic device 100 to the user.

It may be understood that, in FIG. 5A to FIG. 5C, FIG. 6, FIG. 7A to FIG. 7C, FIG. 8A and FIG. 8B, and the related descriptions, when the electronic device 100 cooperates with the head-mounted display device 200 to provide a VR scenario, all the mentioned images displayed on the head-mounted display device 200 are generated by the electronic device 100 and then sent to the head-mounted display device 200 for displaying. For a principle in which the electronic device 100 cooperates with the head-mounted display device 200 to provide a VR scenario, refer to related descriptions in the embodiments in FIG. 2, FIG. 3A, FIG. 3B, and FIG. 3C.

In addition to the VR scenario mentioned in an example in the foregoing embodiments, the display method provided in embodiments of this application may be further used in an AR/MR scenario or the like. For an implementation principle, refer to related descriptions in the foregoing embodiments.

In addition to the case in which the electronic device cooperates with the head-mounted display device to provide the VR/AR/MR scenario in the foregoing embodiments, the display method provided in embodiments of this application may be further applied to a case in which the head-mounted display device independently provides a VR/AR/MR scenario.

Figure 9A:
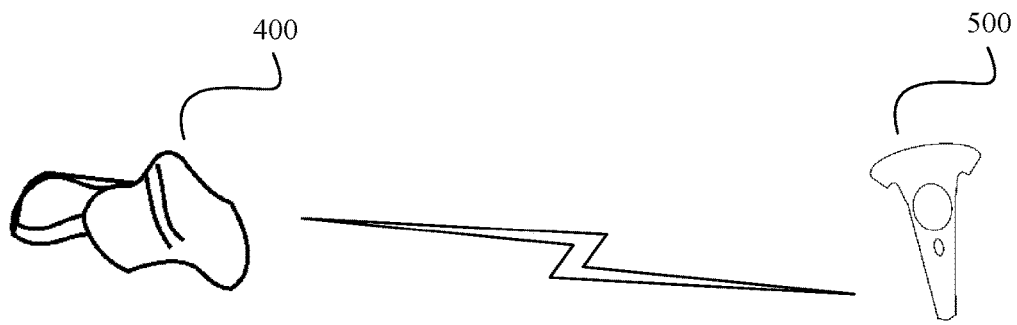
FIG. 9A is a schematic diagram of an architecture of another system according to an embodiment of this application.

FIG. 9A shows another system 20 according to an embodiment of this application. The system 20 may display an image by using technologies such as VR, AR, and MR, so that a user experiences a 3D scenario, and VR/AR/MR experience is provided for the user.

As shown in FIG. 9A, the system 20 may include a head-mounted display device 400 and an input device 500. The head-mounted display device 400 is worn on the head of the user, and the input device 500 is handheld by the user. It may be understood that the input device 500 is optional, that is, the system 20 may not include the input device 500.

A difference between the system 20 and the system 10 lies in that the system 20 does not include an electronic device, and the head-mounted display device 400 in the system 20 integrates functions implemented by the electronic device 100 in the display method provided in the foregoing embodiment and a related hardware apparatus.

The head-mounted display device 400 and the input device 500 may be wirelessly connected and communicate with each other by using a short-distance transmission technology such as Bluetooth, NFC, or ZigBee, or may be wiredly connected and communicate with each other through a USB port, an HDMI interface, a user-defined interface, or the like.

For an implementable form of the head-mounted display device 400, refer to descriptions of the head-mounted display device 200. For an implementation form of the input device 500, refer to descriptions of the input device 300. The user may enter a user operation on the input device 500 to trigger the head-mounted display device 400 to perform a corresponding function. For a specific implementation principle of any of the embodiments discussed herein, refer to related descriptions in the system 10.

In the foregoing embodiment, all operations performed by the electronic device 100 and the head-mounted display device 400 may be independently performed by the head-mounted display device 400. For example, the head-mounted display device 400 may obtain a first location, a second location, a third location, and a fourth location according to an indication of the user, and may further calculate Δi1 based on the first location and the second location, calculate Δi2 based on the third location and the fourth location, calculate an IPD according to Formula 1, generate a first image and a second image based on the IPD of the user, display the first image and the second image on displays, and the like. For embodiments of operations performed when the head-mounted display device 400 performs the display method in embodiments of this application, refer to FIG. 5A to FIG. 5C, FIG. 6, FIG. 7A to FIG. 7C, FIG. 8A and FIG. 8B, and related descriptions.

Figure 9B:
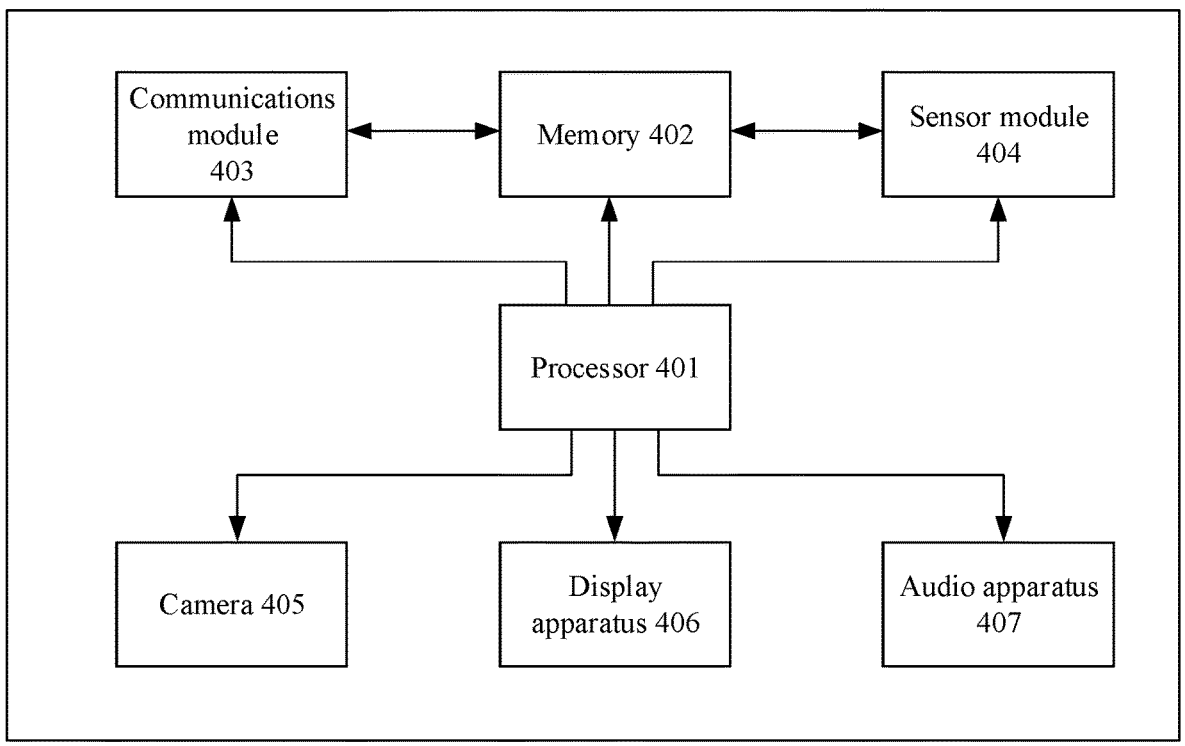
FIG. 9B is a schematic diagram of a hardware structure of another head-mounted display device according to an embodiment of this application.

FIG. 9B is a schematic diagram of a structure of the head-mounted device 400 according to an embodiment of this application.

As shown in FIG. 9B, the head-mounted display device 400 may include a processor 401, a memory 402, a communications module 403, a sensor system 404, a camera 405, a display apparatus 406, and an audio apparatus 407. The foregoing components may be coupled and connected and communicate with each other.

It may be understood that the structure shown in FIG. 9B does not constitute a specific limitation on the head-mounted display device 400. In some other embodiments of this application, the head-mounted display device 400 may include more or fewer components than those shown in the figure, or combine some components, or split some components, or have different component arrangements. For example, the head-mounted display device 400 may further include a physical button such as a power button, a volume button, and various interfaces such as a USB port. The components shown in the figure may be implemented by hardware, software, or a combination of software and hardware.

The processor 401 may include one or more processing units. For example, the processor 401 may include an AP, a modem processor, a GPU, an ISP, a controller, a video codec, a DSP, a baseband processor, and/or an NPU. Different processing units may be independent devices, or may be integrated into one or more processors. The controller may generate an operation control signal based on an instruction operation code and a time sequence signal, to complete control of instruction fetching and instruction execution, so that each component performs a corresponding function, for example, human-computer interaction, motion tracking/prediction, rendering and display, and audio processing.

The memory 402 stores executable program code used to perform the display method provided in embodiments of this application. The executable program code includes instructions. The memory 402 may include a program storage area and a data storage area. The program storage area may store an operating system, an application required by at least one function (for example, a sound playing function or an image playing function), and the like. The data storage area may store data (for example, audio data) created during use of the head-mounted display device 400, and the like. In addition, the memory 402 may include a high-speed random access memory, and may further include a nonvolatile memory, for example, at least one magnetic disk storage device, a flash memory device, or a universal flash storage (universal flash storage, UFS). The processor 401 runs instructions stored in the memory 402 and/or instructions stored in the memory disposed in the processor, to perform various function applications and data processing of the head-mounted display device 400.

The communications module 403 may include a mobile communications module and a wireless communications module. The mobile communications module may provide a wireless communication solution that includes 2G/3G/4G/5G or the like and that is applied to the head-mounted display device 400. The wireless communications module may provide a wireless communication solution that includes a WLAN, BT, a GNSS, FM, IR, or the like and that is applied to the head-mounted display device 400. The wireless communications module may be one or more devices integrating at least one communications processor module.

The sensor system 404 may include an accelerometer, a compass, a gyro, a magnetometer, another sensor configured to detect motion, or the like. The sensor system 404 is configured to collect corresponding data. For example, an acceleration sensor collects an acceleration of the head-mounted display device 400, and a gyro sensor collects a motion speed of the head-mounted display device 400. The data collected by the sensor system 404 may reflect a motion status of the head of the user wearing the head-mounted display device 400. In some embodiments, the sensor system 404 may be an inertial measurement unit (inertial measurement unit, IMU) disposed in the head-mounted display device 400. In some embodiments, the head-mounted display device 400 may send the data obtained by the sensor system to the processor 401 for analysis. The processor 401 may determine a motion status of the head of the user based on data collected by each sensor, and perform a corresponding function based on the motion status of the head of the user, for example, enable an IPD measurement function. In embodiments, the user may enter a head motion operation on the head-mounted display device 400 to trigger the head-mounted display device 400 to perform a corresponding function. The motion status of the head of the user may include whether the head of the user rotates, a rotation direction, and the like.

The sensor system 404 may further include an optical sensor, configured to: track an eye location of the user and capture eyeball motion data in combination with the camera 405. The eyeball motion data may be, for example, used to determine an eye spacing of the user, a 3D location of each eye relative to the head-mounted display device 400, an amplitude of torsion and rotation (that is, pitching and shaking) of each eye, and a gaze direction. In an example, infrared light is emitted inside the head-mounted display device 400 and reflected from each eye, reflected light is detected by the camera 405 or the optical sensor, and detected data is transmitted to the processor 401, so that the processor 401 analyzes a location, a pupil diameter, a motion status, and the like of the eye of the user based on a change of the infrared light reflected from each eye.

The camera 405 may be configured to capture a static image or a video. The static image or the video may be an external-oriented image or video around a user, or may be an internal-oriented image or video. The camera 405 may track movement of a single eye or both eyes of the user. The camera 405 includes but is not limited to a conventional color camera (RGB camera), a depth camera (RGB depth camera), a dynamic vision sensor (dynamic vision sensor, DVS) camera, and the like. The depth camera may obtain depth information of a photographed object. In some embodiments, the camera 405 may be configured to: capture an image of an eye of the user, and send the image to the processor 401 for analysis. The processor 401 may determine a status of the eye of the user based on the image collected by the camera 405, and perform a corresponding function based on the status of the eye of the user. In embodiments, the user may enter an eye motion operation on the head-mounted display device 400 to trigger the head-mounted display device 400 to perform a corresponding function. The status of the eye of the user may include whether the eye of the user rotates, a rotation direction, whether the eye of the user does not rotate for a long time, an angle of looking at the outside, and the like.

The head-mounted display device 400 presents or displays images by using a GPU, the display apparatus 406, an application processor, and the like.

The GPU is a microprocessor for image processing, and is connected to the display apparatus 406 and the application processor. The processor 401 may include one or more GPUs that execute program instructions to generate or change display information. The GPU is configured to: perform mathematical and geometric calculation based on data obtained from the processor 401, and render an image by using a computer graphics technology, a computer simulation technology, or the like, to provide content to be displayed on the display apparatus 406. The GPU is further configured to add correction or pre-distortion to an image rendering process, to compensate for or correct distortion caused by an optical component of the display apparatus 406. The GPU may further adjust, based on data from the sensor system 404, the content provided to the display apparatus 406. For example, the GPU may add, based on a 3D location of an eye of the user, an inter-pupillary distance, and the like, depth of field information to the content provided to the display apparatus 406.

The display apparatus 406 may include one or more displays and one or more optical components. The one or more displays include the display 101 and the display 103. The one or more optical components include the optical component 102 and the optical component 104. Herein, for structures of the display 101, the display 103, the optical component 102, and the optical component 104 and a location relationship between the display 101, the display 103, the optical component 102, and the optical component 104, refer to related descriptions in FIG. 1. In subsequent method embodiments, for ease of description, reference numerals in FIG. 1 are still used for reference numerals of components in the display apparatus 206 of the head-mounted display device 200, that is, the head-mounted display device 200 includes the display 101, the display 103, the optical component 102, and the optical component 104.

In this embodiment of this application, a display of the head-mounted display device 400, for example, the display 101 or the display 103, is configured to: receive data or content (for example, a rendered image) processed by the GPU of the head-mounted display device 400, and display the data or the content. It may be understood that the head-mounted display device 400 has a powerful computing function and can independently perform rendering to generate images. In this case, the head-mounted display device 400 may be an all-in-one machine with a powerful computing capability or the like, and can independently present a 3D scenario to the user without using the electronic device 100, to provide VR/AR/MR experience for the user.

In this embodiment of this application, the processor 401 may be configured to determine an IPD of the user based on interaction between the user and the head-mounted display device 400. The GPU of the head-mounted display device may be further configured to determine, based on the IPD of the user that is obtained from the processor 210, images to be displayed on the head-mounted display device 400. The head-mounted display device 400 may display, on the displays, the images determined by the GPU.

The images displayed on the display 101 and the display 103 have parallax, to simulate binocular vision, so that the user can feel a depth of an object corresponding to the images, to generate a real 3D sense.

The display, for example, the display 101 or the display 103, may include a display panel. The display panel may be configured to display an image, to present a stereoscopic virtual scenario to the user. The display panel may be an LCD, an OLED, an AMOLED, an FLED, a mini-LED, a micro-LED, a micro-OLED, a QLED, or the like.

The optical component, for example, the optical component 102 or the optical component 104, is configured to guide light from the display to an exit pupil for user perception. In some implementations, one or more optical elements (for example, lenses) in the optical component may have one or more coatings, such as an anti-reflection coating. Magnification of the optical component for image light allows the display to be physically smaller and lighter, and consume lower power. In addition, the magnification for the image light may extend a field of view of content displayed on the display. For example, the optical component may enable the field of view of the content displayed on the display to be an entire field of view of the user.

The optical component may be further configured to correct one or more optical errors. Examples of the optical errors include barrel distortion, pincushion distortion, longitudinal chromatic aberration, lateral chromatic aberration, spherical aberration, comet aberration, field curvature, astigmatism, and the like. In some implementations, content provided to the display for displaying is pre-distorted, and the distortion is corrected by the optical component when the optical component receives image light generated based on the content from the display.

The audio apparatus 407 is configured to: collect and output audio. The audio apparatus 407 may include but is not limited to a microphone, a speaker, a headset, and the like.

The implementations of this application may be randomly combined to achieve different technical effects.

All or some of the foregoing embodiments may be implemented by using software, hardware, firmware, or any combination thereof. When software is used to implement embodiments, embodiments may be all or partially implemented in a form of a computer program product. The computer program product includes one or more computer instructions. When the computer program instructions are loaded and executed on a computer, all or some of the procedures or functions described in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive (SSD)), or the like.

A person of ordinary skill in the art may understand that all or some of the procedures of the methods in embodiments may be implemented by a computer program instructing related hardware. The program may be stored in a computer-readable storage medium. When the program is executed, the procedures of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A system, comprising:
a head-mounted display device configured to be worn on a head of a user; and
an electronic device, coupled with the head-mounted display device, configured to send user interfaces to the head-mounted display device, and the head-mounted display device is configured to display the user interfaces on displays of the head-mounted display device;
the electronic device is further configured to obtain an inter-pupillary distance (IPD) of the user based on leftmost edges and rightmost edges that can be seen by the user on the displays of the head-mounted display device, the IPD of the user is obtained based on user operations entered by the user based on the user interfaces; and the electronic device is further configured to: obtain a source image, correct the source image based on the IPD of the user to obtain target images, and send the target images to the head-mounted display device; and
the head-mounted display device is further configured to display the target images on the displays of the head-mounted display device.

2. The system according to claim 1, wherein the displays comprise a first display and a second display, the head-mounted display device further comprises a first optical component corresponding to the first display and a second optical component corresponding to the second display, a first straight line on which a center of the first display and a center of the first optical component are located is perpendicular to a third straight line, a second straight line on which a center of the second display and a center of the second optical component are located is perpendicular to the third straight line, and the third straight line is a straight line on which the center of the first optical component and the center of the second optical component are located;

the user interfaces comprise a first user interface and a second user interface, and the head-mounted display device is configured to: display the first user interface on the first display and display the second user interface on the second display; and
the target images comprise a first target image and a second target image, and the head-mounted display device is configured to: display the first target image on the first display, and display the second target image on the second display.

3. The system according to claim 2, wherein:
the head-mounted display device is further configured to:
obtain a first location and a second location, wherein the first location and the second location are obtained based on an action performed by the user when the first user interface is displayed; obtain a third location and a fourth location, wherein the third location and the fourth location are obtained based on an action performed by the user when the second user interface is displayed; and send the first location, the second location, the third location, and the fourth location to the electronic device; and
the electronic device is further configured to:
determine a first offset ($\Delta i1$) of an eye of the user relative to the first straight line based on the first location and the second location, determine a second offset ($\Delta i2$) of the eye of the user relative to the second straight line based on the third location and the fourth location, and obtain the IPD of the user based on $\Delta i1$ and $\Delta i2$, wherein
the first location is a location that is on a left side of the first display and at which the eye of the user looks when the head-mounted display device displays the first user interface, the second location is a location that is on a right side of the first display and at which the eye of the user looks when the head-mounted display device displays the first user interface, the third location is a location that is on a left side of the second display and at which the eye of the user looks when the head-mounted display device displays the second user interface, and the fourth location is a location that is on a right side of the second display and at which the eye of the user looks when the head-mounted display device displays the second user interface.

4. The system according to claim 2, wherein:
the head-mounted display device is further configured to:
send, to the electronic device, operation data of the user that is collected when the first user interface is displayed and operation data of the user that is collected when the second user interface is displayed; and
the electronic device is further configured to:
obtain a first location and a second location, wherein the first location and the second location are obtained based on the operation data of the user that is collected when the head-mounted display device displays the first user interface; and obtain a third location and a fourth location, wherein the third location and the fourth location are obtained based on the operation data of the user that is collected when the head-mounted display device displays the second user interface; and
determine a first offset ($\Delta i1$) of an eye of the user relative to the first straight line based on the first location and the second location, determine a second offset ($\Delta i2$) of the eye of the user relative to the second straight line based on the third location and the fourth location, and obtain the IPD of the user based on $\Delta i1$ and $\Delta i2$, wherein the first location is a location that is on a left side of the first display and at which the eye of the user looks when the head-mounted display device displays the first user interface, the second location is a location that is on a right side of the first display and at which the eye of the user looks when the head-mounted display device displays the first user interface, the third location is a location that is on a left side of the second display and at which the eye of the user looks when the head-mounted display device displays the second user interface, and the fourth location is a location that is on a right side of the second display and at which the eye of the user looks when the head-mounted display device displays the second user interface.

5. The system according to claim 3, wherein the electronic device is configured to calculate the IPD of the user according to the following formula:

$$IPD=IOD-\Delta i1+\Delta i2, \text{ wherein}$$

the IOD is a distance between the center of the first display and the center of the second display.

6. The system according to claim 3, wherein the electronic device is configured to:
generate a first image and a second image based on the IPD of the user by using the source image;
generate the first target image based on the first image, wherein a center of the first target image is obtained by adjusting a center of the first image by $\Delta i1$; and
generate the second target image based on the second image, wherein a center of the second target image is obtained by adjusting a center of the second image by $\Delta i2$.

7. The system according to claim 3, wherein the source image comprises a third image and a fourth image; and
the electronic device is configured to:
generate the first target image based on the third image, wherein a center of the first target image is obtained by adjusting a center of the third image by $\Delta i1$; and
generate the second target image based on the fourth image, wherein a center of the second target image is obtained by adjusting a center of the fourth image by $\Delta i2$.

8. A display method, comprising:
sending, by an electronic device, user interfaces to a head-mounted display device, wherein the user interfaces are configured to be displayed on displays of the head-mounted display device;
obtaining, by the electronic device, an inter-pupillary distance (IPD) of a user based on leftmost edges and rightmost edges that can be seen by the user on the displays of the head-mounted display device, the IPD of the user is obtained based on user operations entered by the user based on the user interfaces; and
obtaining, by the electronic device, a source image, correcting the source image based on the IPD of the user to obtain target images, and sending the target images to the head-mounted display device, wherein the target images are displayed on the displays of the head-mounted display device.

9. The method according to claim 8, wherein the displays comprise a first display and a second display, the head-mounted display device further comprises a first optical component corresponding to the first display and a second optical component corresponding to the second display, a first straight line on which a center of the first display and a center of the first optical component are located is perpendicular to a third straight line, a second straight line on which a center of the second display and a center of the second optical component are located is perpendicular to the third straight line, and the third straight line is a straight line on which the center of the first optical component and the center of the second optical component are located;
the user interfaces comprise a first user interface and a second user interface, the first user interface is configured to be displayed on the first display, and the second user interface is configured to be displayed on the second display; and
the target images comprise a first target image and a second target image, the first target image is used to be displayed on the first display, and the second target image is used to be displayed on the second display.

10. The method according to claim 9, wherein the obtaining, by the electronic device, the IPD of the user comprises:
receiving, by the electronic device, a first location, a second location, a third location, and a fourth location that are sent by the head-mounted display device; and
determining, by the electronic device, a first offset ($\Delta i1$) of an eye of the user relative to the first straight line based on the first location and the second location, determining a second offset ($\Delta i2$) of the eye of the user relative to the second straight line based on the third location and the fourth location, and obtaining the IPD of the user based on $\Delta i1$ and $\Delta i2$, wherein
the first location is a location that is on a left side of the first display and at which the eye of the user looks when the head-mounted display device displays the first user interface, the second location is a location that is on a right side of the first display and at which the eye of the user looks when the head-mounted display device displays the first user interface, the third location is a location that is on a left side of the second display and at which the eye of the user looks when the head-mounted display device displays the second user interface, and the fourth location is a location that is on a right side of the second display and at which the eye of the user looks when the head-mounted display device displays the second user interface.

11. The method according to claim 9, wherein the obtaining, by the electronic device, the IPD of the user comprises:
receiving, by the electronic device, operation data of the user that is collected by the head-mounted display device when the head-mounted display device displays the first user interface and operation data of the user that is collected by the head-mounted display device when the head-mounted display device displays the second user interface;
obtaining, by the electronic device, a first location and a second location, wherein the first location and the second location are obtained based on the operation data of the user that is collected when the head-mounted display device displays the first user interface; and obtaining a third location and a fourth location, wherein the third location and the fourth location are obtained based on the operation data of the user that is collected when the head-mounted display device displays the second user interface; and
determining, by the electronic device, a first offset ($\Delta i1$) of an eye of the user relative to the first straight line based on the first location and the second location, determining a second offset ($\Delta i2$) of the eye of the user relative to the second straight line based on the third location and the fourth location, and obtaining the IPD of the user based on $\Delta i1$ and $\Delta i2$, wherein the first location is a location that is on a left side of the first display and at which the eye of the user looks when the head-mounted display device displays the first user interface, the second location is a location that is on a right side of the first display and at which the eye of the user looks when the head-mounted display device displays the first user interface, the third location is a location that is on a left side of the second display and at which the eye of the user looks when the head-mounted display device displays the second user interface, and the fourth location is a location that is on a right side of the second display and at which the eye of the user looks when the head-mounted display device displays the second user interface.

12. The method according to claim 10, wherein the obtaining, by the electronic device, the IPD of the user based on $\Delta i1$ and $\Delta i2$ comprises:
calculating, by the electronic device, the IPD of the user according to the following formula:

$$IPD=IOD-\Delta i1+\Delta i2, \text{ wherein}$$

the IOD is a distance between the center of the first display and the center of the second display.

13. The method according to claim 10, wherein the correcting the source image based on the IPD of the user to obtain target images comprises:
generating, by the electronic device, a first image and a second image based on the IPD of the user by using the source image;
generating, by the electronic device, the first target image based on the first image, wherein a center of the first target image is obtained by adjusting a center of the first image by $\Delta i1$; and
generating, by the electronic device, the second target image based on the second image, wherein a center of the second target image is obtained by adjusting a center of the second image by $\Delta i2$.

14. The method according to claim 10, wherein the source image comprises a third image and a fourth image, and the correcting the source image based on the IPD of the user to obtain target images comprises:
generating, by the electronic device, the first target image based on the third image, wherein a center of the first target image is obtained by adjusting a center of the third image by $\Delta i1$; and
generating, by the electronic device, the second target image based on the fourth image, wherein a center of the second target image is obtained by adjusting a center of the fourth image by $\Delta i2$.

15. An electronic device, wherein the electronic device comprises one or more processors and a memory, wherein the memory is coupled to the one or more processors, the memory is configured to store computer program code, the computer program code comprises computer instructions, and the one or more processors invoke the computer instructions, so that the electronic device performs operations, comprising:
sending user interfaces to a head-mounted display device, wherein the user interfaces are configured to be displayed on displays of the head-mounted display device;
obtaining an inter-pupillary distance (IPD) of a user based on leftmost edges and rightmost edges that can be seen by the user on the displays of the head-mounted display device, the IPD of the user is obtained based on user operations entered by the user based on the user interfaces; and
obtaining a source image, correcting the source image based on the IPD of the user to obtain target images, and sending the target images to the head-mounted display device, wherein the target images are displayed on the displays of the head-mounted display device.

16. The electronic device according to claim 15, wherein the displays comprise a first display and a second display, the head-mounted display device further comprises a first optical component corresponding to the first display and a second optical component corresponding to the second display, a first straight line on which a center of the first display and a center of the first optical component are located is perpendicular to a third straight line, a second straight line on which a center of the second display and a center of the second optical component are located is perpendicular to the third straight line, and the third straight line is a straight line on which the center of the first optical component and the center of the second optical component are located;
the user interfaces comprise a first user interface and a second user interface, the first user interface is configured to be displayed on the first display, and the second user interface is configured to be displayed on the second display; and
the target images comprise a first target image and a second target image, the first target image is used to be displayed on the first display, and the second target image is used to be displayed on the second display.

17. The electronic device according to claim 16, wherein the one or more processors are configured to invoke the computer instructions, so that the electronic device performs the further operations comprising:
receiving a first location, a second location, a third location, and a fourth location that are sent by the head-mounted display device; and
determining a first offset ($\Delta i1$) of an eye of the user relative to the first straight line based on the first location and the second location, determining a second offset ($\Delta i2$) of the eye of the user relative to the second straight line based on the third location and the fourth location, and obtaining the IPD of the user based on $\Delta i1$ and $\Delta i2$, wherein
the first location is a location that is on a left side of the first display and at which the eye of the user looks when the head-mounted display device displays the first user interface, the second location is a location that is on a right side of the first display and at which the eye of the user looks when the head-mounted display device displays the first user interface, the third location is a location that is on a left side of the second display and at which the eye of the user looks when the head-mounted display device displays the second user interface, and the fourth location is a location that is on a right side of the second display and at which the eye of the user looks when the head-mounted display device displays the second user interface.

18. The electronic device according to claim 17, wherein the one or more processors are configured to invoke the computer instructions, so that the electronic device performs further operation comprising:
calculating the IPD of the user according to the following formula:

$$IPD=IOD-\Delta i1+\Delta i2, \text{ wherein}$$

the IOD is a distance between the center of the first display and the center of the second display.

19. The electronic device according to claim 17, wherein the one or more processors are configured to invoke the computer instructions, so that the electronic device performs further operations comprising:

generating a first image and a second image based on the IPD of the user by using the source image;
   generating the first target image based on the first image, wherein a center of the first target image is obtained by adjusting a center of the first image by $\Delta i1$; and
   generating the second target image based on the second image, wherein a center of the second target image is obtained by adjusting a center of the second image by $\Delta i2$.

20. The electronic device according to claim 17, wherein the one or more processors are configured to invoke the computer instructions, so that the electronic device performs further operations comprising:

generating the first target image based on a third image, wherein a center of the first target image is obtained by adjusting a center of the third image by $\Delta i1$; and
   generating the second target image based on a fourth image, wherein a center of the second target image is obtained by adjusting a center of the fourth image by $\Delta i2$.

* * * * *